(12) United States Patent
Kim et al.

(10) Patent No.: US 11,561,756 B2
(45) Date of Patent: Jan. 24, 2023

(54) DISPLAY DEVICE INCLUDING A SOUND GENERATOR AND VIBRATION DAMPING MEMBER

(71) Applicant: Samsung Display Co., LTD., Yongin-si (KR)

(72) Inventors: Tae Sung Kim, Hwaseong-si (KR); Byeong Hee Won, Incheon (KR); Young Ji Kim, Jeju-si (KR); Yi Joon Ahn, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 338 days.

(21) Appl. No.: 16/841,680

(22) Filed: Apr. 7, 2020

(65) Prior Publication Data

US 2020/0379709 A1 Dec. 3, 2020

(30) Foreign Application Priority Data

May 28, 2019 (KR) .................. 10-2019-0062683

(51) Int. Cl.
| | | |
|---|---|---|
| *G06F 3/16* | (2006.01) | |
| *G06F 1/16* | (2006.01) | |
| *G10K 9/128* | (2006.01) | |
| *G10K 9/125* | (2006.01) | |

(52) U.S. Cl.
CPC .............. *G06F 3/16* (2013.01); *G06F 1/1605* (2013.01); *G10K 9/125* (2013.01); *G10K 9/128* (2013.01)

(58) Field of Classification Search
None
See application file for complete search history.

(56) References Cited

U.S. PATENT DOCUMENTS

| | | | |
|---|---|---|---|
| 9,818,805 B2 | 11/2017 | Choi et al. | |
| 10,652,641 B2 | 5/2020 | Kim et al. | |
| 10,728,669 B2 | 7/2020 | Choi et al. | |
| 2012/0140969 A1 | 6/2012 | Fujise et al. | |
| 2017/0280216 A1* | 9/2017 | Lee .................. | H04R 9/066 |
| 2018/0053813 A1 | 2/2018 | Choi et al. | |
| 2018/0164890 A1 | 6/2018 | Park et al. | |
| 2019/0037164 A1 | 1/2019 | Kim et al. | |
| 2019/0208299 A1* | 7/2019 | Kim .................. | H04R 17/00 |

(Continued)

FOREIGN PATENT DOCUMENTS

| | | |
|---|---|---|
| EP | 3229272 | 10/2017 |
| EP | 3364636 | 8/2018 |
| EP | 3396972 | 10/2018 |

(Continued)

OTHER PUBLICATIONS

Partial European Search Report—European Application No. 20175579.0 dated Oct. 19, 2020.

(Continued)

*Primary Examiner* — Harry S Hong
(74) *Attorney, Agent, or Firm* — Cantor Colburn LLP

(57) ABSTRACT

A display device includes: a display panel; a first sound generator disposed on one surface of the display panel, where the first sound generator vibrates the display panel to output a first sound; and a first vibration damping member disposed between the display panel and the first sound generator, where the first vibration damping member reduces a vibration displacement of the display panel.

22 Claims, 33 Drawing Sheets

(56) References Cited

U.S. PATENT DOCUMENTS

2020/0236452 A1    7/2020   Kim et al.
2020/0322728 A1   10/2020   Choi et al.

FOREIGN PATENT DOCUMENTS

| | | |
|---|---|---|
| EP | 3439317 | 2/2019 |
| EP | 3506652 | 7/2019 |
| KR | 101704517 B1 | 2/2017 |
| KR | 101746496 B1 | 6/2017 |
| KR | 101780302 B1 | 9/2017 |
| KR | 101780297 B1 | 10/2017 |
| KR | 1020170115124 A | 10/2017 |
| KR | 1020170135465 A | 12/2017 |
| KR | 101817102 B1 | 1/2018 |
| KR | 1020180003372 A | 1/2018 |
| KR | 101817105 B1 | 2/2018 |
| KR | 1020180062320 A | 6/2018 |
| KR | 1020180121293 A | 11/2018 |
| KR | 1020180121296 A | 11/2018 |
| KR | 1020190000462 A | 1/2019 |

OTHER PUBLICATIONS

Extended European Search Report—European Application No. 20175579.0 dated Feb. 23, 2021.

\* cited by examiner

DISPLAY DEVICE INCLUDING A SOUND GENERATOR AND VIBRATION DAMPING MEMBER

This application claims priority to Korean Patent Application No. 10-2019-0062683, filed on May 28, 2019, and all the benefits accruing therefrom under 35 U.S.C. § 119, the content of which in its entirety is herein incorporated by reference.

BACKGROUND

1. Field

Embodiments of the disclosure relate to a display device.

2. Description of the Related Art

With the development of information society, demands for display devices for displaying images are increasing in various forms. For example, display devices are widely used for various electronic devices such as smart phones, tablet personal computers ("PC"s), digital cameras, laptop computers, navigators, and televisions. The display device may be a flat panel display device such as a liquid crystal display device, a field emission display device, an organic light emitting display device, or a quantum dot light emitting display device.

SUMMARY

The display device may include a display panel for displaying an image, a sound generator for outputting a high sound by vibrating the display panel, and a woofer for outputting a low sound. Since the woofer is typically disposed behind the display device while the high sound generated by vibrating the display panel by the sound generator is output in a front direction of the display device, the low sound may be output in a direction other than the front direction of the display device. Therefore, the high and low sounds of the display device may not be effectively or realistically provided to a user.

Embodiments of the disclosure including a display device capable of improving sound quality by outputting a low sound and a high sound in the front direction of the display device.

However, embodiments of the disclosure are not restricted to those set forth herein. The above and other embodiments of the disclosure will become more apparent to one of ordinary skill in the art to which the disclosure pertains by referencing the detailed description of the disclosure given below.

According to an embodiment of the disclosure, a display device includes: a display panel; a first sound generator disposed on a surface of the display panel, where the first sound generator vibrates the display panel to output a first sound; and a first vibration damping member disposed between the display panel and the first sound generator, where the first vibration damping member reduces a vibration displacement of the display panel.

In an embodiment, the first vibration damping member may include a first metal plate and a second metal plate facing each other, and an adhesive layer disposed between the first metal plate and the second metal plate.

In an embodiment, a thickness of the first metal plate and a thickness of the second metal plate may be less than a thickness of the adhesive layer.

In an embodiment, the first vibration damping member may include a corner having a curvature in a plan view.

In an embodiment, the first vibration damping member may have a circular shape in a plan view.

In an embodiment, the first vibration damping member may include a heat radiation pin protruding in a thickness direction of the display panel.

In an embodiment, the heat radiation pin may be disposed to surround the first sound generator.

In an embodiment, the display device may further include blocking members disposed on the surface of the display panel, disposed to surround the first sound generator, where the blocking members define a first area in which the first sound generator is disposed, where an area of the first vibration damping member may be smaller than an area of the first area.

In an embodiment, the display device may further include a lower chassis disposed on the surface of the display panel, where a through hole may be defined in the lower chassis, and the through hole may be in the first area in the plan view.

In an embodiment, the first sound generator may include a bobbin disposed on the first vibration damping member; a voice coil surrounding the bobbin; and a magnet disposed on the bobbin and spaced apart from the bobbin.

In an embodiment, the display device may further include a second sound generator disposed on the surface of the display panel, where the second sound generator may output a second sound by vibrating the display panel, and the second sound may be in a higher frequency band than the first sound.

In an embodiment, the second sound generator may not overlap the first vibration damping member in a thickness direction of the display panel.

In an embodiment, the display device may further include a third sound generator disposed on the surface of the display panel, where the third sound generator may output a third sound by vibrating the display panel, and the third sound may be in a higher frequency band than the first sound.

In an embodiment, the display device may further include blocking members disposed on the surface of the display panel and disposed between the first sound generator and the second sound generator and between the first sound generator and the third sound generator.

In an embodiment, each of the second sound generator and the third sound generator includes a first electrode to which a first driving voltage is applied; a second electrode to which a second driving voltage is applied; and a vibration layer disposed between the first electrode and the second electrode, where the vibration layer may include a piezoelectric material, which contracts and expands in response to the first driving voltage applied to the first electrode and the second driving voltage applied to the second electrode.

In an embodiment, the display device may further include a lower chassis disposed on the surface of the display panel; a flexible film attached to a side portion of the display panel; and a control circuit board disposed on the lower chassis and electrically connected to the flexible film.

In an embodiment, the first sound generator may not overlap the control circuit board in a thickness direction of the display panel.

In an embodiment, the control circuit board may be disposed on the first sound generator, and the control circuit board may be fixed to a connection supporting portion disposed on the lower chassis.

In an embodiment, the display device may further include a fourth sound generator disposed on the surface of the display panel, where the fourth sound generator may output a fourth sound by vibrating the display panel, and the fourth sound may be in a lower frequency band than the second sound.

In an embodiment, the fourth sound generator may be disposed on the first vibration damping member.

In an embodiment, the display device may further include a second vibration damping member disposed between the display panel and the fourth sound generator, where the second vibration damping member may reduce the vibration displacement of the display panel.

In an embodiment, the display device may further include a fifth sound generator disposed on the surface of the display panel, where the fifth sound generator may output a fifth sound by vibrating the display panel, and the fifth sound may be in a higher frequency band than the first sound; and a sixth sound generator disposed on the surface of the display panel, where the sixth sound generator may output a sixth sound by vibrating the display panel, and the sixth sound may be in a higher frequency band than the first sound.

In an embodiment, the display device may further include blocking members disposed on the surface of the display panel between the first sound generator and the second sound generator, between the first sound generator and the third sound generator, between the fourth sound generator and the fifth sound generator, between the fourth sound generator and the sixth sound generator, between the second sound generator and the fifth sound generator, and between the third sound generator and the sixth sound generator.

According to embodiments of the disclosure, the first sound generator can output a sound having a low-frequency band by using the display panel as a vibration plate, and the second sound generator and the third sound generator can output a sound having a high-frequency band by using the display panel as a vibration plate. In such embodiments, the display device may output a sound having a low-frequency band and a sound having a high-frequency band in the front direction of the display device, thereby improving sound quality.

In such embodiments, since a vibration damping member having high rigidity is disposed between the display panel and the first sound generator, the vibration displacement of the display panel caused by the first sound generator can be reduced. Therefore, it is possible to prevent the vibration of the display panel from being visually recognized to the user seeing an image.

Other features and embodiments may be apparent from the following detailed description, the drawings, and the claims.

BRIEF DESCRIPTION OF THE DRAWINGS

The above and other features of the invention will become more apparent by describing in more detail embodiments thereof with reference to the attached drawings, in which.

DETAILED DESCRIPTION

Figure 1:
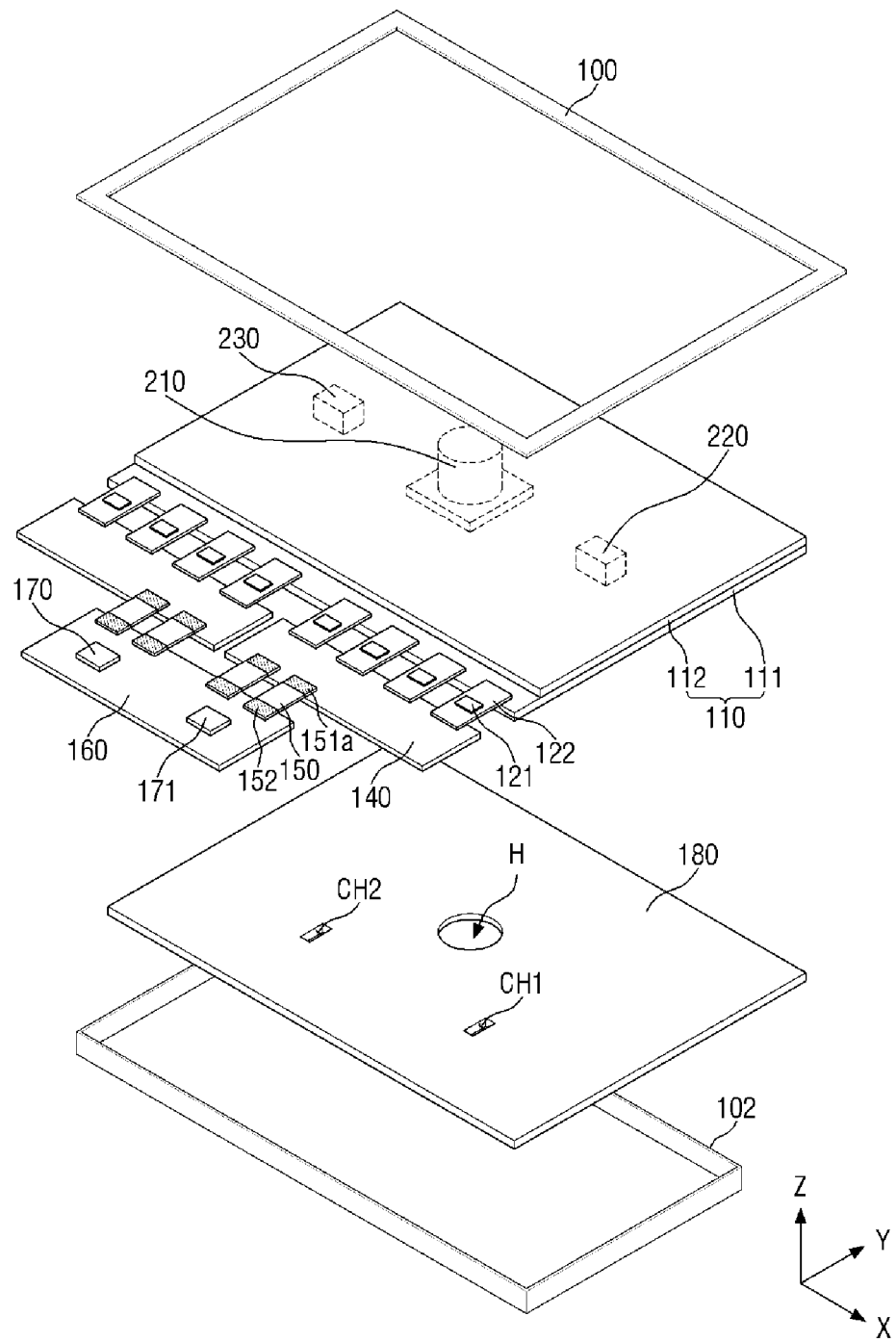
FIG. 1 is an exploded perspective view of a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. As used herein, the phrase "at least one of" modifying listed items includes any and all combinations of one or more of the listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is an exploded perspective view of a display device according to an embodiment.

Referring to FIG. 1, an embodiment of a display device 10 includes an upper set cover 101, a lower set cover 102, a display panel 110, source driving circuits 121, flexible films 122, a heat radiation film 130 (shown in FIG. 2), source circuit boards 140, first cables 150, a control circuit board 160, a timing control circuit 170, a sound driving circuit 171, a lower chassis 180, a first sound generator 210, a second sound generator 220, and a third sound generator 230. In an embodiment, the display device 10 may further include a functional layer 114 (shown in FIGS. 4A and 5) disposed on the display panel 110. The functional layer 114 may include, for example, a touch sensing layer, a haptic layer or an optical layer (e.g., an antireflective layer such as a polarization film), but not being limited thereto.

In this specification, the "on", "over", "top", "upper side", or "upper surface" refers to a direction in which a second substrate 112 is disposed with respect to a first substrate 111 of the display panel 110, that is, a thickness direction of the display panel 110 or the Z-axis direction, and the "beneath", "under", "bottom", "lower side", or "lower surface" refers to a direction in which the heat radiation film 130 is disposed with respect to the first substrate 111 of the display panel 110, that is, a direction opposite to the Z-axis direction. Further, the "left", "right", "upper", and "lower" refer to directions when the display panel 110 is viewed in a top plan view or a plan view in the Z-axis direction. For example, the "left" refers to the first direction (X-axis direction), the "right" refers to a direction opposite to the first direction (X-axis direction), the "upper" refers to the second direction (Y-axis direction), and the "lower" refers to a direction opposite to the second direction (Y-axis direction).

The upper set cover 101 may be disposed to cover edge portions of the upper surface of the display panel 110. The upper set cover 101 may cover the non-display area of the display panel 110 other than the display area of the display panel 110. The lower set cover 102 may be disposed under the lower chassis 180. When the flexible films are bent to allow the source circuit boards 140, the first cables 150, and the control circuit board to be disposed under the display panel 110, the lower set cover 102 may be disposed to cover the source circuit boards 140, the first cables 150, and the control circuit board 160. Although it is shown in FIG. 1 that the length of the lower set cover 102 in the second direction (Y-axis direction) is shorter than the length of the lower chassis 180 in the second direction (Y-axis direction), the invention is not limited thereto. Alternatively, the length of the lower set cover 102 in the second direction (Y-axis direction) may be greater than or substantially equal to the length of the lower chassis 180 in the second direction (Y-axis direction). The upper set cover 101 and the lower set cover 102 may include a plastic or a metal, or a combination thereof.

Figure 2:
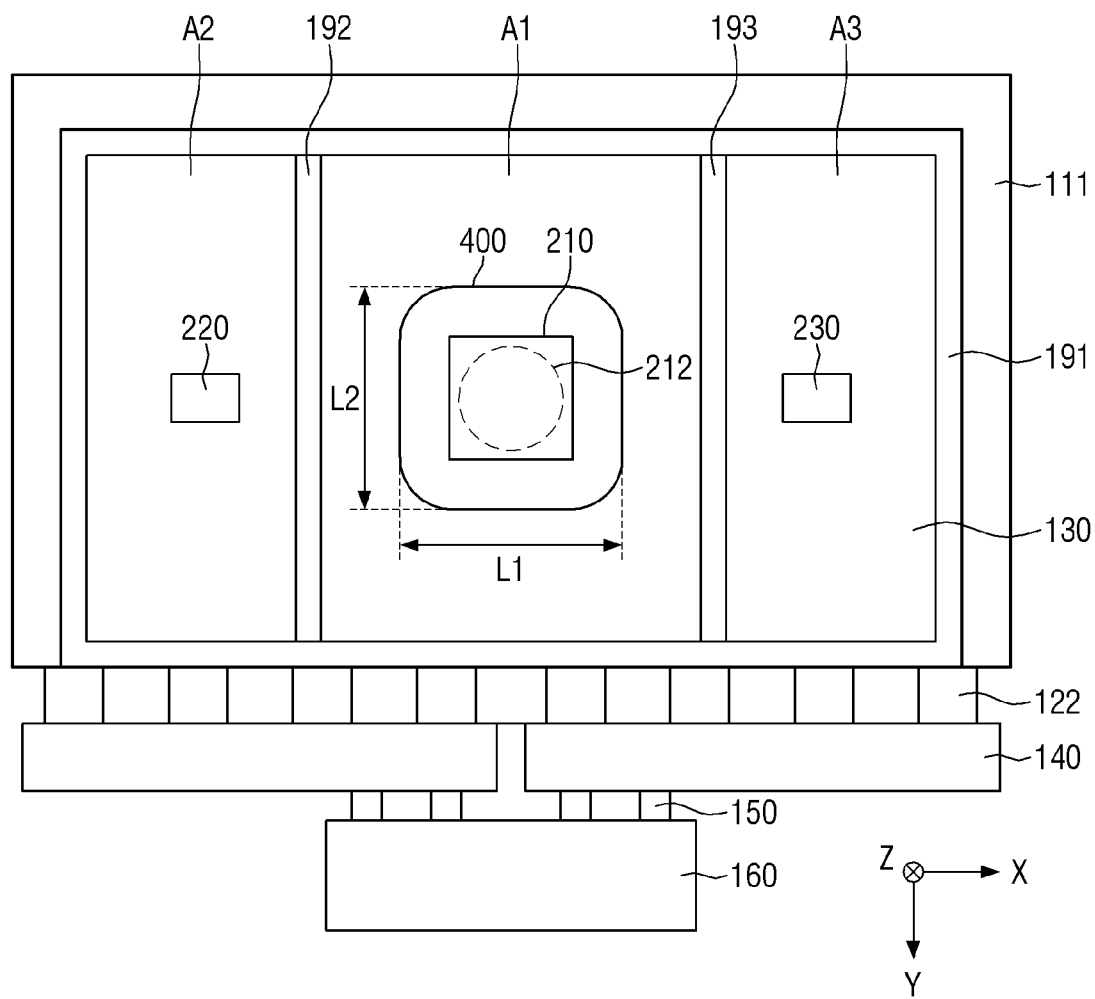
FIG. 2 is a bottom view showing an embodiment of a display panel of FIG. 1 in a state where flexible films are unfolded.

The display panel 110 may have a rectangular shape in a plan view. In one embodiment, for example, as shown in FIG. 2, the display panel 110 may have a rectangular planar shape having long sides in the first direction (X-axis direction) and short sides in the second direction (Y-axis direction). The corner where the long side in the first direction (X-axis direction) meets the short side in the second direction (Y-axis direction) may be formed to have a right angle shape or have a round shape of a predetermined curvature. The planar shape of the display panel 110 is not limited to a rectangular shape, and may be variously modified in another polygonal shape, a circular shape, or an elliptical shape.

Although it is illustrated in FIG. 2 that the display panel 110 is formed to be flat, the invention is not limited thereto. The display panel 110 may be formed to be bent at a predetermined curvature.

The display panel 110 may include a first substrate 111 and a second substrate 112. The second substrate 112 may be disposed to face the first surface of the first substrate 111. The first substrate 111 and the second substrate 112 may be rigid or flexible. The first substrate 111 may include or be formed of a glass or a plastic. The second substrate 112 may include or be formed of a glass, a plastic, an encapsulation film, or a barrier film. Alternatively, the second substrate 112 may be omitted. In an embodiment, where the first substrate 111 and the second substrate 112 are formed of a plastic, the plastic may be polyethersulphone ("PES"), polyacrylate ("PA"), polyarylate ("PAR"), polyetherimide ("PEI"), polyethylenenapthalate ("PEN"), polyethyleneterepthalate ("PET"), polyphenylenesulfide ("PPS"), polyallylate, polyimide ("PI"), polycarbonate ("PC"), cellulose triacetate ("CAT"), cellulose acetate propionate ("CAP"), or a combination thereof. The encapsulation film or the barrier film may be a film in which a plurality of inorganic films are laminated one on another.

The display panel 110 may be an organic light emitting display panel using an organic light emitting diode including a first electrode, an organic light emitting layer, and a second electrode; an inorganic light emitting display panel using an inorganic light emitting diode including a first electrode, an inorganic semiconductor layer, and a second electrode; or a quantum dot light emitting display panel using a quantum dot light emitting diode including a first electrode, a quantum dot light emitting layer, and a second electrode.

Figure 9:
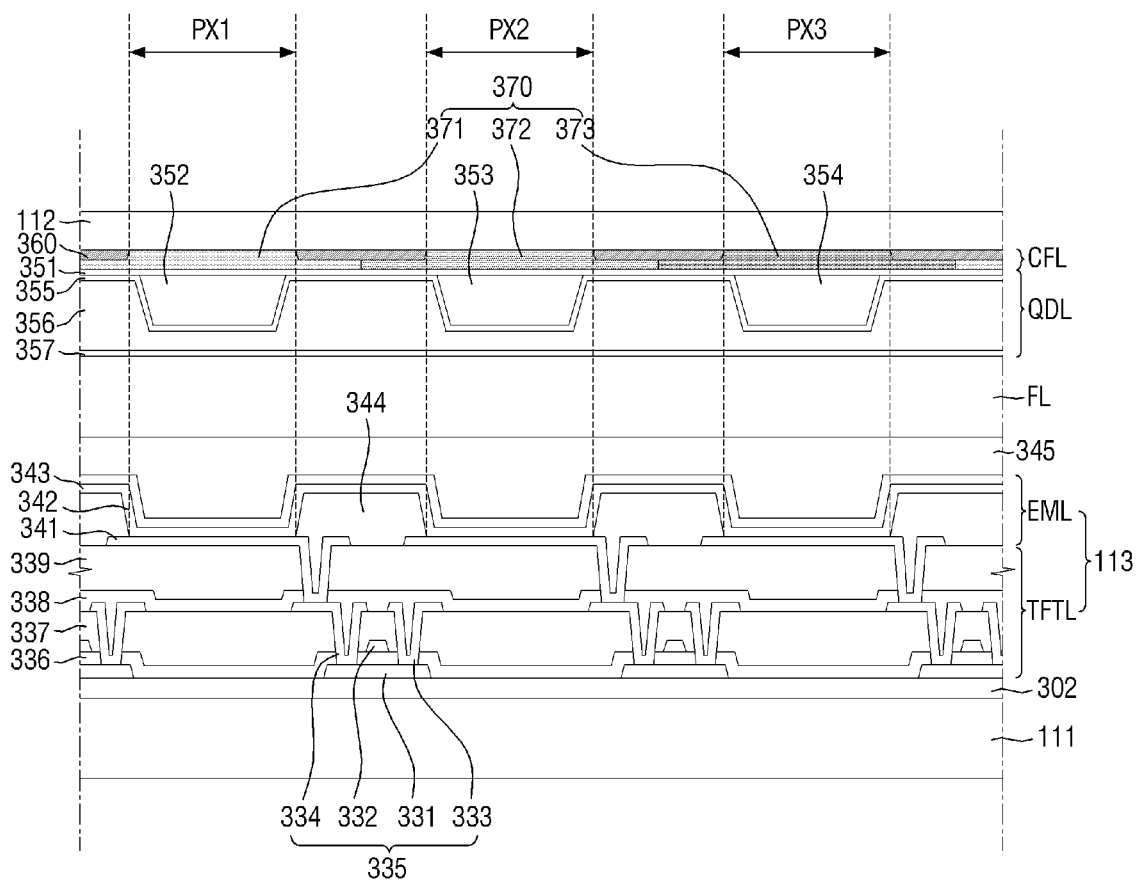
FIG. 9 is a cross-sectional view showing an embodiment of a first substrate, a second substrate, and a pixel array layer of a display panel.

Hereinafter, for convenience of description, embodiments where the display panel 110 includes a thin film transistor TFTL, a light emitting element layer EML, a filler FL, an optical wavelength conversion layer QDL, and a color filter layer CFL, which are disposed between the first substrate 111 and the second substrate 112, as shown in FIG. 9, will be described in detail. In such embodiments, the first substrate 111 may be a thin film transistor substrate on which the thin film transistor TFTL, the light emitting element layer EML, and the thin film encapsulation layer TFEL are disposed, the second substrate 112 may a color filter substrate on which the optical wavelength conversion layer QDL and the color filter layer CFL are disposed, and the filler FL may be disposed between the thin film encapsulation layer TFEL of the first substrate 111 and the optical wavelength conversion layer QDL of the second substrate 112.

Alternatively, the second substrate 112 of the display panel 110 may be omitted, and the thin film encapsulation layer may be disposed on the light emitting element layer EML. In such an embodiment, the filler FL may be omitted, and the optical wavelength conversion layer QDL and the color filter layer CFL may be disposed on the thin film encapsulation layer.

A surface of each of the flexible films 122 may be attached on a surface of the first substrate 111 of the display panel 110, and an opposing surface of each of the flexible films 122 may be attached to a surface of the source circuit board 140. In an embodiment, as shown in FIG. 1, the size of the first substrate 111 is larger than that of the second substrate 112, such that one side of the first substrate 111 may be exposed without being covered by the second substrate 112. The flexible films 122 may be attached to one side portion of the first substrate 111 exposed without being covered by the second substrate 112. Each of the flexible films 122 may be attached to one surface of the first substrate 111 and one surface of the source circuit board 140 using an anisotropic conductive film.

Figure 3:
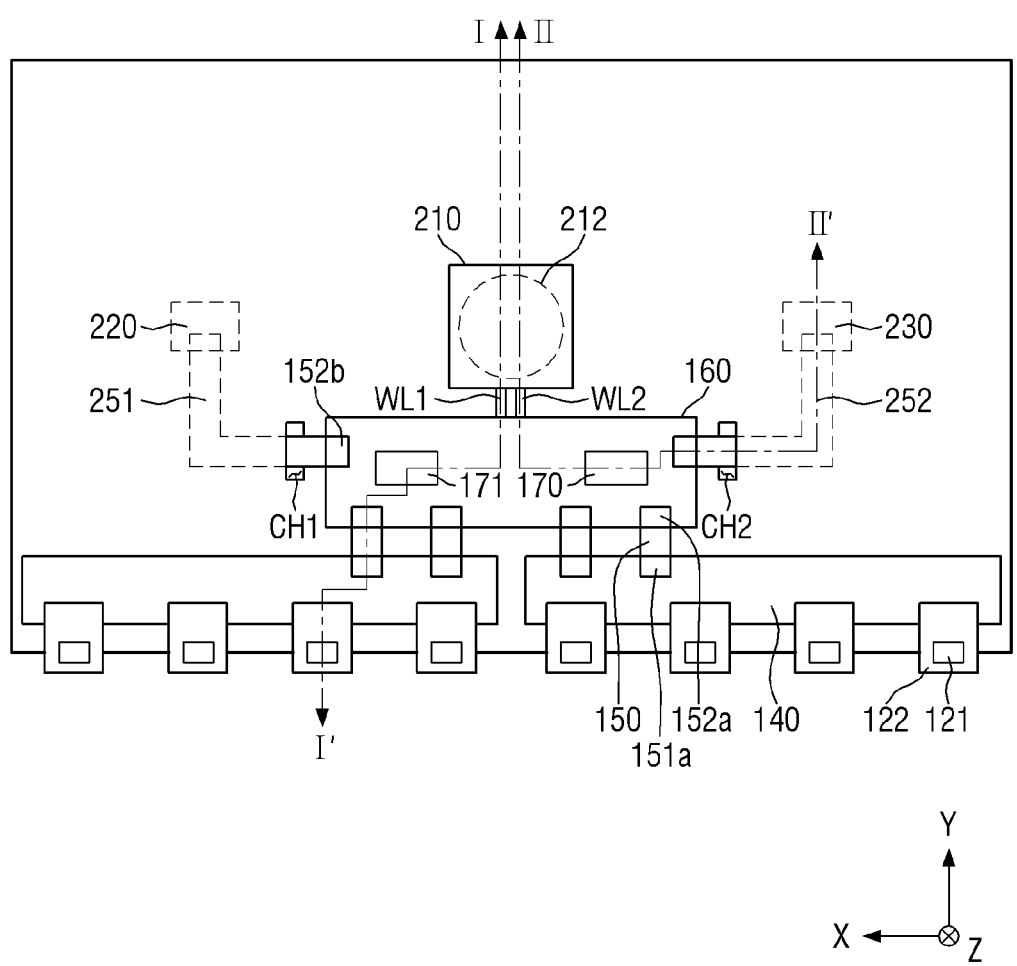
FIG. 3 is a bottom view showing an embodiment of a display panel coupled with a lower chassis when flexible films are bent toward the lower portion of the lower chassis.

Each of the flexible films 122 may be a flexible film such as a tape carrier package or a chip on film. In an embodiment, each of the flexible films 122 may be bent toward the lower portion of the first substrate 111 as shown in FIGS. 3, 4, and 5. In such an embodiment, the source circuit boards 140, the first cables 150, and the control circuit board 160 may be disposed on the lower surface of the lower chassis 180. Although it is illustrated in FIG. 1 that eight flexible films 122 are attached onto the first substrate 111 of the display panel 110, the number of the flexible films 122 in embodiments is not limited thereto.

The source driving circuit 121 may be disposed on one surface of each of the flexible films 122. The source driving circuits 121 may be formed of or defined by an integrated circuit ("IC"). Each of the source driving circuits 121 converts digital video data into analog data voltages based on the source control signal of the timing control circuit 170, and supplies the analog data voltages to the data lines of the display panel 110.

The display panel 110 may include scan lines intersecting the data lines, and pixels arranged in the areas defined by the data lines and the scan lines. The scan lines may receive scan signals from a scan driver formed on the display panel 110. The scan driver may include a plurality of thin film transistors to generate scan signals based on a scan control signal of the timing control circuit 170. Each of the pixels is connected to at least one data line and at least one scan line, and receives a data voltage of the data line when the scan signal is supplied to the scan line.

Each of the source circuit boards 140 may be connected to the control circuit board 160 through the first cables 150. Each of the source circuit boards 140 may include first connectors 151a for connection thereto to the first cables 150. Each of the source circuit boards 140 may be a flexible printed circuit board or a printed circuit board. The first cables 150 may be flexible cables.

In an embodiment, the control circuit board 160 may be connected to the source circuit boards 140 through the first cables 150. In such an embodiment, the control circuit board 160 may include second connectors 152a for connection thereto to the first cables 150. The control circuit board 160 may be fixed on one surface of the lower chassis 180 through a fixing member such as a screw. The control circuit board 160 may be a flexible printed circuit board or a printed circuit board.

Although it is illustrated in FIG. 2 that four first cables 150 connect the source circuit boards 140 and the control circuit board 160, the number of the first cables 150 in embodiments is not limited thereto. Further, although it is illustrated in FIG. 2 that two source circuit boards are provided, the number of the source circuit boards 140 in embodiments is not limited thereto.

Alternatively, when the number of the flexible films 122 is small, the source circuit boards 140 may be omitted. In such an embodiment, the flexible films 122 may be directly connected to the control circuit board 160.

The timing control circuit 170 may be disposed on one surface of the control circuit board 160. The timing control circuit 170 may be defined by or formed as an IC. The timing control circuit 170 may receive digital video data and timing signals from the system-on-chip of a system circuit board, and may generate a source control signal for controlling the timing of the source driving circuits based on the timing signals.

The sound driving circuit 171 may be disposed on one surface of the control circuit board 160. The sound driving circuit 171 may be defined by or formed as an IC. The sound driving circuit 171 may receive sound data from a system circuit board. The sound driving circuit 171 may convert the sound data, which is digital data, into a first sound signal, a second sound signal and a third sound signal, which are analog signals. The sound driving circuit 171 may output the first sound signal to the first sound generator 210, may output the second sound signal to the second sound generator 220, and may output the third sound signal to the third sound generator 230.

The system-on-chip may be mounted on a system circuit board that is connected to the control circuit board 160 through another flexible cable, and may be formed as an IC. The system-on-chip may be a processor of a smart television ("TV"), a central processing unit ("CPU") or a graphic card of a desktop or laptop computer, or an application processor of a smart phone or a tablet PC. The system circuit board may be a flexible printed circuit board or a printed circuit board.

A power supply circuit may be additionally attached to one surface of the control circuit board 160. The power supply circuit may generate voltages used for driving the display panel 110 from a main power source applied from the system circuit board, and may supply the voltages to the display panel 110. In one embodiment, for example, the power supply circuit may generate a high-potential voltage, a low-potential voltage, and an initialization voltage for driving the organic light emitting element, and may supply the generated voltages to the display panel 110. In an embodiment, the power supply circuit may generate and supply driving voltages for driving the source driving circuits 121, the timing control circuit 170, and the like. The power supply circuit may be defined by or formed as an IC.

Alternatively, the power supply circuit may be disposed on another power supply circuit board separately formed from the control circuit board 160. The power supply circuit board may be a flexible printed circuit board or a printed circuit board.

The first sound generator 210, the second sound generator 220, and the third sound generator 230 may be disposed on a second surface of the first substrate 111 opposite to the first surface of the first substrate 111. The first sound generator 210 may be a vibrating device capable of vibrating the display panel 110 in the third direction (Z-axis direction) corresponding to the first sound signal of the sound driving circuit 171. The second sound generator 220 may be a vibrating device capable of vibrating the display panel 110 in the third direction (Z-axis direction) corresponding to the second sound signal of the sound driving circuit 171. The third sound generator 230 may be a vibrating device capable of vibrating the display panel 110 in the third direction (Z-axis direction) corresponding to the third sound signal of the sound driving circuit 171.

Figure 10:
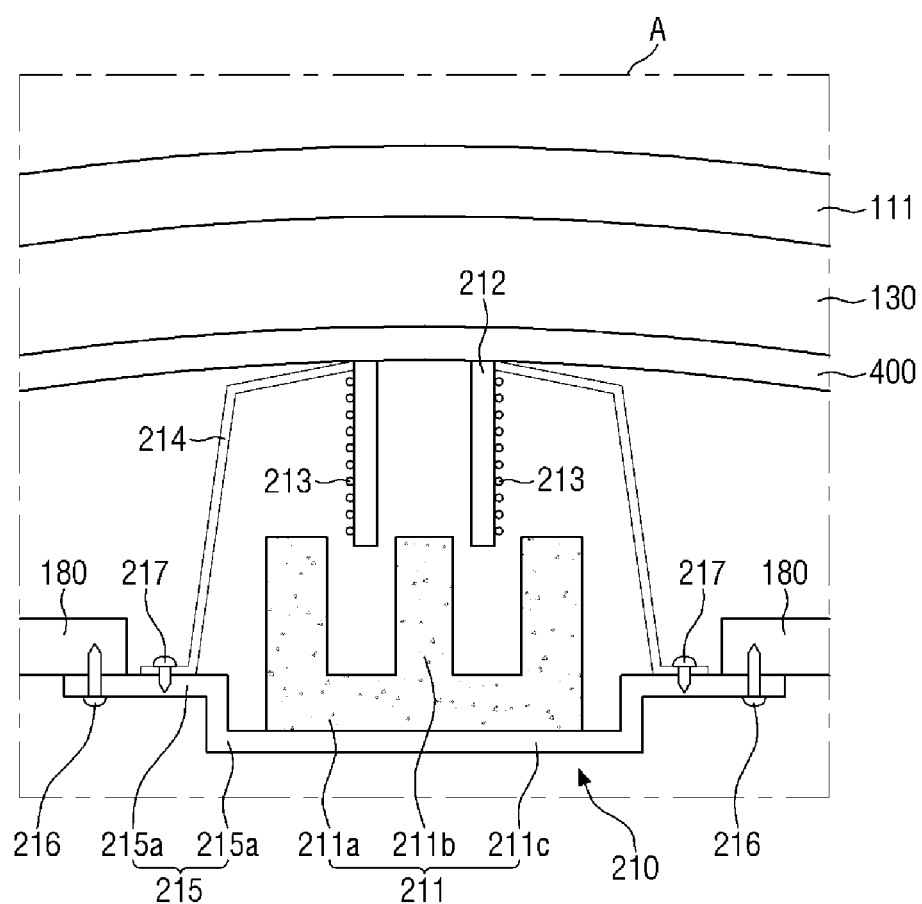
FIGS. 10 and 11 are exemplary views showing the vibration of the display panel by the first sound generator.
Figure 11:
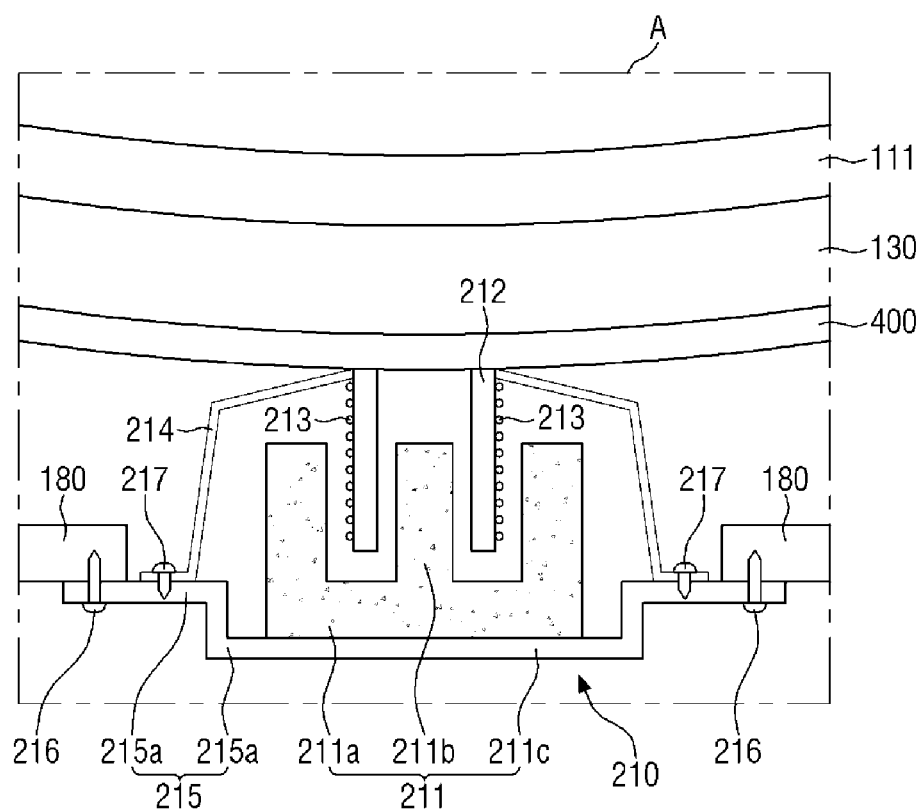
Figure 12:
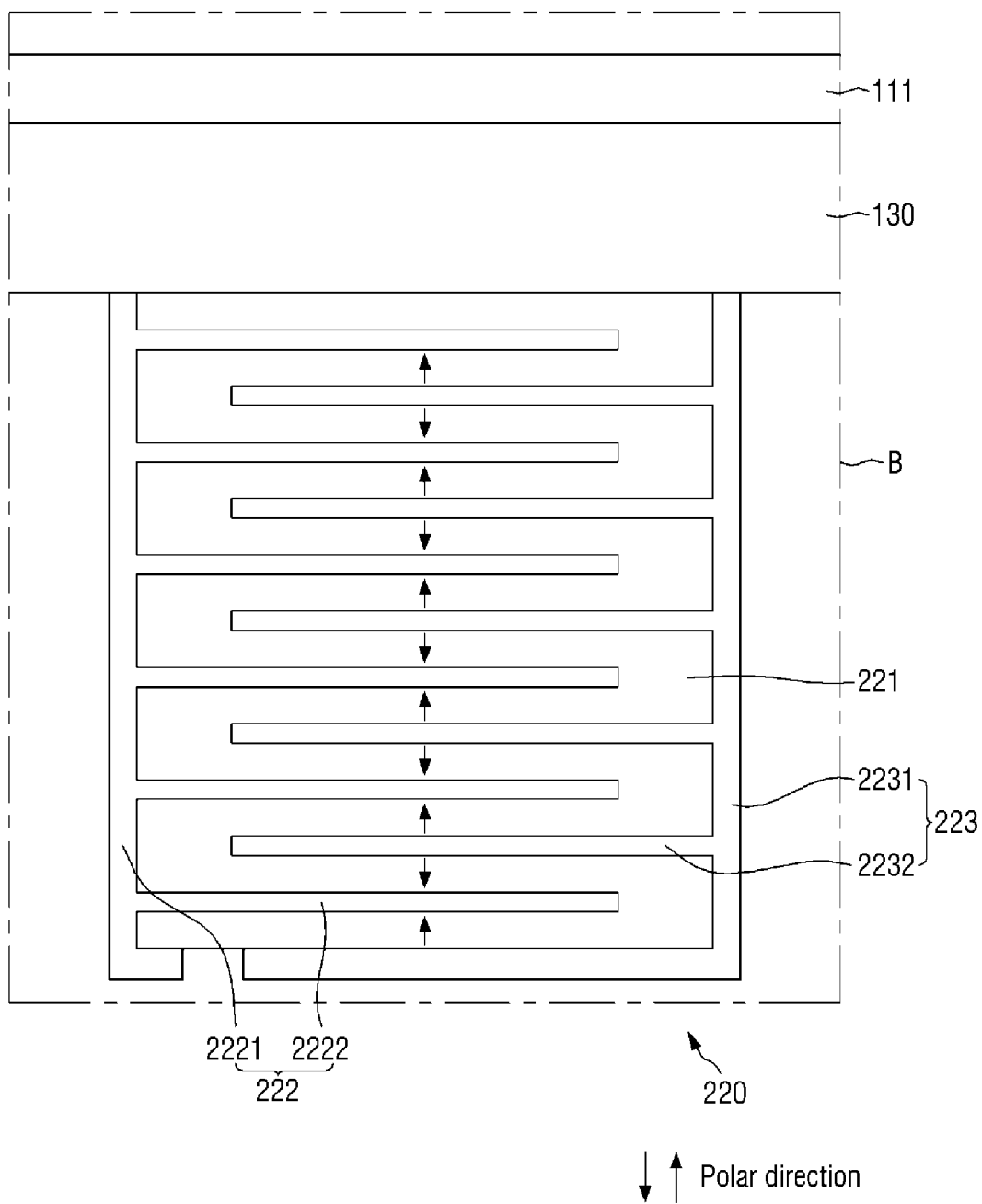
FIG. 12 is an exemplary view showing the vibration of the display panel by the second sound generator of FIG. 5.
Figure 13:
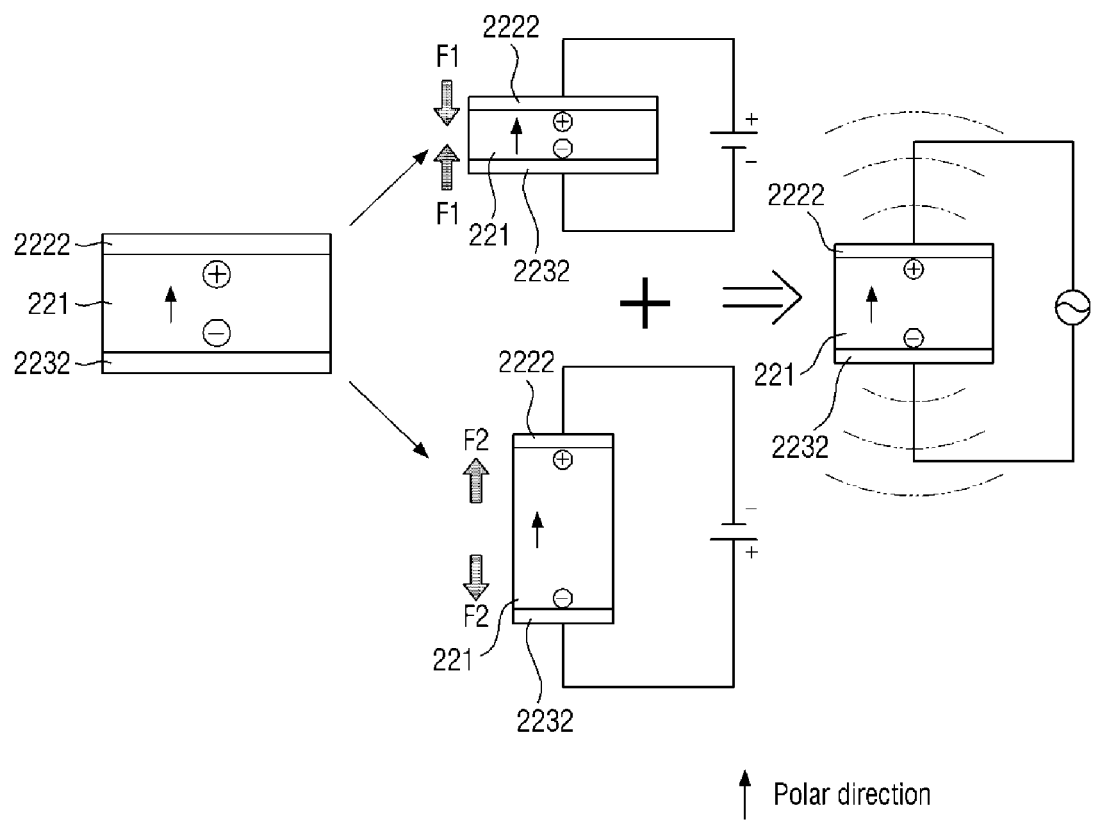
FIG. 13 is an exemplary view showing a method of vibrating a vibration layer disposed between the first branch electrode and second branch electrode of a second sound generator.

In an embodiment, the first sound generator 210 may be an exciter for vibrating the display panel 110 by generating a magnetic force using a voice coil as shown in FIGS. 10 and 11. In an embodiment, each of the second sound generator and the second sound generator may be a piezoelectric element or piezoelectric actuator for vibrating the display panel 110 using a piezoelectric material that contracts and expands based on the applied voltage as shown in FIGS. 12 and 13.

The first sound generator 210 may serve as a low sound generator for outputting a sound of a low frequency band. The second sound generator 220 may serve as a high sound generator for outputting a sound of a high frequency band. The third sound generator 230 may serve as a high sound generator for outputting a sound of a high frequency band. The sound of a low frequency band may indicate a sound of a low frequency band having a frequency of about 800 megahertz (MHz) or less, and the sound of a high frequency band may indicate a sound of a high frequency band having a frequency higher than about 800 MHz. However, the embodiment of the invention is not limited thereto. Further, when the sound of a low frequency band is a sound of a low frequency band having a frequency of about 800 MHz or less, both a low sound and a middle sound may be included.

The lower chassis 180 may be disposed on the second surface of the first substrate 111. A hole H, in which the first sound generator 210 is disposed, may be defined or formed in an area of the lower chassis 180 corresponding to the first sound generator 210. In such an embodiment, the lower chassis 180 may be provided with a first cable hole CH1 through which the first sound circuit board 251 for connecting the control circuit board 160 to the second sound generator 220 and the control circuit board 160 are passed, and a second cable hole CH2 through which the second sound circuit board 252 for connecting the third sound generator 230 is disposed. The lower chassis 180 may include or be made of a metal or a reinforced glass.

As described above, according to an embodiment of the display device 10 shown in FIG. 1, the first sound generator 210 may output a sound of a low frequency band by using the display panel 110 as a vibration plate, and the second sound generator 220 and the third sound generator 230 may output a sound of a high frequency band by using the display panel 110 as a vibration plate. In such an embodiment, since the sound of a low frequency band and the sound of a high frequency band may be output in the front direction (or Z-axis direction) of the display device 10, sound quality may be improved.

In an embodiment, as illustrated in FIG. 1, the display device 10 is a middle- or large-sized display device including a plurality of source driving circuits 121, but the invention is not limited thereto. Alternatively, the display device 10 may be a small-sized display device including a single source driving circuit 121. In such an embodiment, the flexible films 122, the source circuit boards 140, and the first cables 150 may be omitted. In such an embodiment, the source driving circuit 121 and the timing control circuit 170 may be integrated into a single IC to be attached onto one flexible circuit board, or may be attached onto the first substrate 111 of the display panel 110. Herein, middle- and large-sized display devices may include monitors and TVs, for example, and small-sized display devices may include smart phones and table PCs, for example.

Figure 4A:
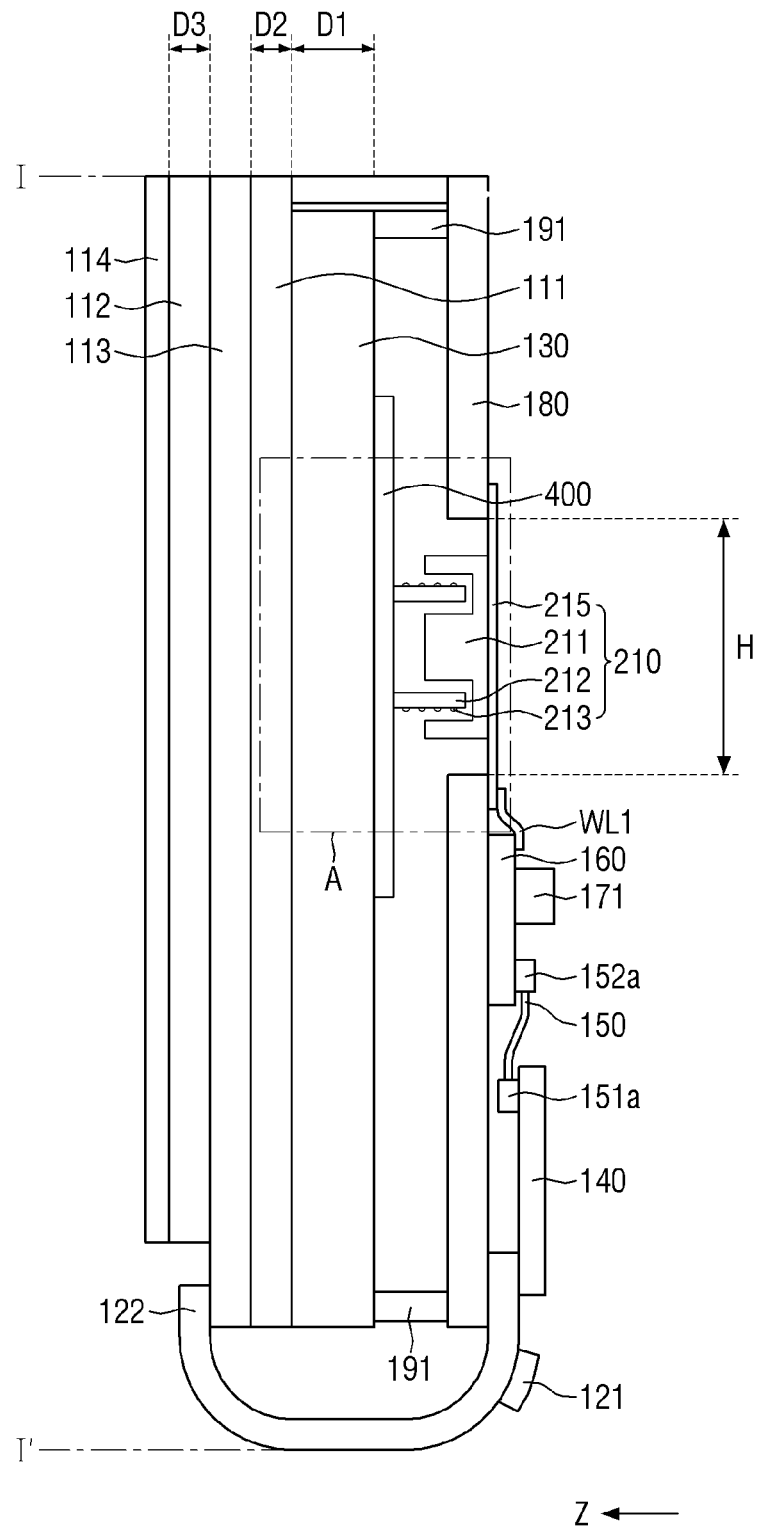
FIG. 4A is a cross-sectional view taken along line I-I' of FIG. 2.
Figure 4B:
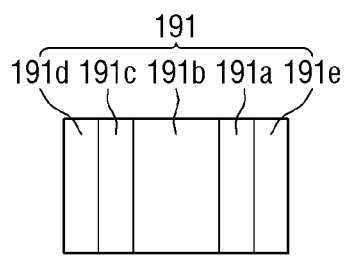
FIG. 4B is an enlarged view of the encircled portion of FIG. 4A.
Figure 5:
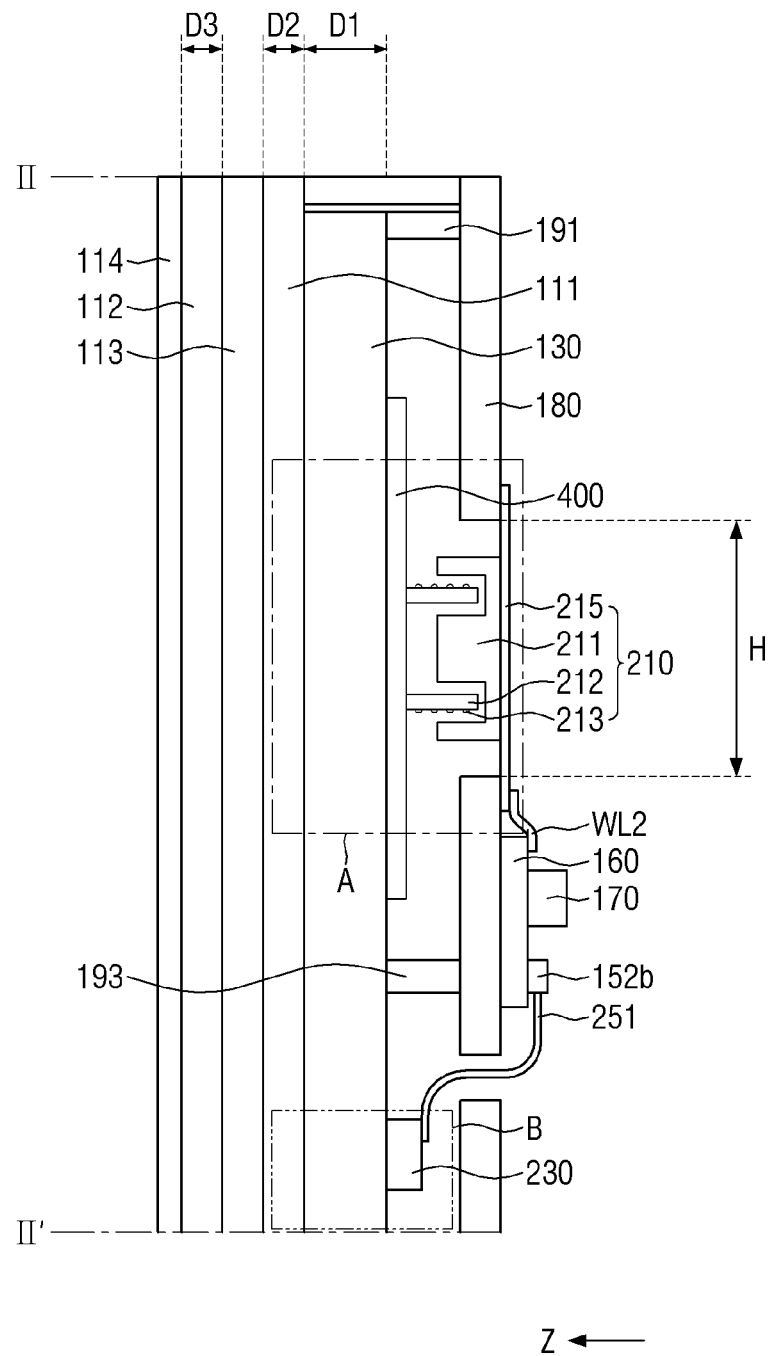
FIG. 5 is a cross-sectional view taken along line II-II' of FIG. 2.

FIG. 2 is a bottom view showing an embodiment of a display panel of FIG. 1 in a state where flexible films are unfolded, FIG. 3 is a bottom view showing an embodiment of a display panel coupled with a lower chassis when flexible films are bent toward the lower portion of the lower chassis, FIG. 4A is a cross-sectional view taken along line I-I' of FIG. 2, FIG. 4B is an enlarged view of the encircled portion of FIG. 4A, and FIG. 5 is a cross-sectional view taken along line II-II' of FIG. 2.

Referring to FIGS. 2 to 5, the first surface of the first substrate 111 and the first surface of the second substrate 112 may face each other. A pixel array layer 113 may be disposed between the first surface of the first substrate 111 and the first surface of the second substrate 112. The pixel array layer 113, as shown in FIG. 9, may include a plurality of pixels PX1, PX2, and PX3 that emit light. The pixel array layer 113 will be described later in greater detail with reference to FIG. 9.

The heat radiation film 130 may be disposed on the second surface of the first substrate 111. The first sound generator 210 may be disposed on one surface of the heat radiation film 130. The heat radiation film 130 serves to radiate the heat generated by the first sound generator 210. In an embodiment, the heat radiation film 130 may include a graphite layer or a metal layer such as a silver (Ag) layer, a copper (Cu) layer, or an aluminum (Al) layer, each having high thermal conductivity.

In an embodiment, the heat radiation film 130 may include a plurality of graphite layers or a plurality of metal layers, which are formed in the first direction (X-axis direction) and the second direction (Y-axis direction). In such an embodiment, since the heat generated by the first sound generator 210 may be diffused in the first direction (X-axis direction) and the second direction (Y-axis direction), the heat may be discharged more effectively. Therefore, the influence of the heat generated by the first sound generator 210 due to the heat radiation film 130 on the display panel 110 may be minimized. In an embodiment, the thickness D1 of the heat radiation film 130 may be thicker than the thickness D2 of the first substrate 111 and the thickness D3 of the second substrate 112 to further reduce the influence of the heat generated by the first sound generator 210 on the display panel 110. In this specification, the first direction (X-axis direction) may be a width direction of the display panel 110, the second direction (Y-axis direction) may be a height direction of the display panel 110, and the third direction (Z-axis direction) may be a thickness direction of the display panel 110.

The size of the heat radiation film 130 may be smaller than that of the first substrate 111, and thus the edge of one surface of the first substrate 111 may be exposed without being covered by the heat radiation film 130.

In an alternative embodiment, the heat radiation film 130 may be omitted, and in such an embodiment, the components arranged on one surface of the heat radiation film 130 may be arranged on the second surface of the first substrate 111.

The flexible films 122 may be bent toward the lower portion of the lower chassis 180, and may be attached to the source circuit board 140 on one surface of the lower chassis 180. The source circuit board 140 and the control circuit board 160 may be disposed on one surface of the lower chassis 180, and may be connected to each other through the first cables 150.

The first sound generator 210 may be disposed closer to the center of the display panel 110 as compared with the second sound generator 220 and the third sound generator 230. The second sound generator 220 may be disposed closer to one side of the display panel 110, for example, the right side of the display panel 110. The third sound generator 230 may be disposed close to the other side of the display panel, for example, the left side of the display panel 110.

In an embodiment, as shown in FIGS. 10 and 11, the first sound generator 210 may include a magnet 211, a bobbin 212, a voice coil 213, and a plate 215. The bobbin 212 may be attached to one surface of the heat radiation film 130 by an adhesive member. The adhesive member may be a double-sided adhesive or a double-sided tape. The voice coil 213 may be wound (or rolled) on the outer peripheral surface of the bobbin 212. Since the bobbin 212 is formed to have a cylindrical shape, a central protrusion of the magnet 211 is disposed inside the bobbin 212, and the side wall of the magnet 211 may be disposed outside the bobbin 212. The plate 215 may be disposed on the lower surface of the magnet 211. The plate 215 may be fixed to one surface of the control circuit board 160 through a fixing member 216 such as a screw.

The magnet 211 and the bobbin 212 are disposed in the hole H of the lower chassis 180, and the plate 215 is disposed on one surface of the lower chassis 180 and is not disposed in the hole H of the lower chassis 180. The size of the hole H may be smaller than the size of the plate 215.

in an embodiment, as shown in FIGS. 3 to 5, the magnet 211 and the bobbin 212 may have a circular shape in a plan view, the plate 215 has a rectangular shape in a plan view, and the hole has a circular shape in a plan view. However, the shapes of the plate 215, the bobbin 212, and the hole H in a plan view are not limited to those shown in FIGS. 3 to 5. In one alternative embodiment, for example, the bobbin 212 and the hole H may have an elliptical shape or a polygonal shape in a plan view. In another alternative embodiment, the plate 215 may have a circular shape, an elliptical shape, or a polygonal shape in a plan view.

The bobbin 212 of the first sound generator 210 may be fixed on one surface of the heat radiation film 130, and the magnet 211 may be fixed to the lower chassis 180. Therefore, the bobbin 212 on which the voice coil 213 is wound may reciprocate in the third direction (Z-axis direction) according to the applied magnetic field formed around the voice coil 213, and thus the display panel 110 may vibrate.

Each of the second sound generator 220 and the third sound generator 230 may be attached onto one surface of the heat radiation film 130 by an adhesive member such as a pressure-sensitive adhesive. The second sound generator 220 may be electrically connected to the control circuit board 160 by the first sound circuit board 251, and the third sound generator 230 may be electrically connected to the control circuit board 160 by the second sound circuit board 252. Each of the first sound circuit board 251 and the second sound circuit board 252 may be a flexible printed circuit board or a flexible cable.

A first pad and a second pad may be disposed on one side of each of the first sound circuit board 251 and the second sound circuit board 252. The first pad of the first sound circuit board 251 may be connected to the first electrode of the second sound generator 220, and the second pad of the first sound circuit board 251 may be connected to the second electrode of the second sound generator 220. The first pad of the second sound circuit board 252 is connected to the first electrode of the third sound generator 230, and the second pad of the second sound circuit board 252 may be connected to the second electrode of the third sound generator 230.

A connection portion for connecting to a second-B connector 152*b* of the control circuit board 160 may be disposed on the other side of each of the first sound circuit board 251 and the second sound circuit board 252. The second sound generator 220 may be connected to the second-B connector 152*b* of the control circuit board 160 by the connection portion of the first sound circuit board 251. The third sound generator 230 may be connected to another second-B connector 152*b* of the control circuit board 160 by the connection portion of the second sound circuit board 252.

The timing control circuit 170 and the sound driving circuit 171 may be disposed on the control circuit board 160. The sound driving circuit 171 may be disposed on another circuit board other than the control circuit board 160. In one embodiment, for example, the sound driving circuit 171 may be disposed on a system circuit board, a power supply circuit board, or a sound circuit board. The sound circuit board refers to a circuit board on which only the sound driving circuit 171 is disposed without other ICs.

The sound driving circuit 171 may include a digital signal processor ("DSP") for digital-processing sound signals, a digital-analog converter DAC for converting the digital signals processed from the digital signal processor into driving voltages as analog signals, and an amplifier ("AMP") for amplifying and outputting the analog driving voltages converted from the digital-analog converter.

The sound driving circuit 171 may generate a first sound signal including a first-A voltage (or a first first voltage) and a first-B voltage (or a second first voltage) for driving the first sound generator 210 based on stereo signals. The sound driving circuit 171 may generate a second sound signal including a second-A voltage (or a first second voltage) and a second-B voltage (or a second second voltage) for driving the second sound generator 220 based on stereo signals. The sound driving circuit 171 may generate a third sound signal including a third-A voltage (or a first third voltage) and a third-B voltage (or a second third voltage) for driving the third sound generator 230 according to stereo signals.

The first sound generator 210 may receive a first sound signal including the first-A driving voltage and the first-B driving voltage from the sound driving circuit 171. The first sound generator 200 may output a sound by vibrating the display panel 110 based on the first-A driving voltage and the first-B driving voltage. In an embodiment, where the lower plate 215 of the first sound generator 210 is disposed on the lower chassis 180, one end and the other end of the voice coil 213 of the first sound generator 210 may be electrically connected to a first sound wiring WL1 and a second sound wiring WL2. The first sound wiring WL1 and the second sound wiring WL2 may be electrically connected to metal lines of the control circuit board 160.

The second sound generator 220 may receive a second sound signal including the second-A driving voltage and the second-B driving voltage from the sound driving circuit 171. The second sound generator 220 may output a sound by vibrating the display panel 110 based on the second-A driving voltage and the second-B driving voltage. The second sound signal of the sound driving circuit 171 may be transmitted to the second sound generator 220 through the first sound circuit board 251.

The third sound generator 230 may receive a third sound signal including the third-A driving voltage and the third-B driving voltage from the sound driving circuit 171. The third sound generator 230 may output a sound by vibrating the display panel 110 based on the third-A driving voltage and the third-B driving voltage. The third sound signal of the sound driving circuit 171 may be transmitted to the third sound generator 230 through the second sound circuit board 252.

in an embodiment, the second sound generator 220 and the third sound generator 230 may be disposed on one surface of the heat radiation film 130. In such an embodiment, the first sound circuit board 251 connected to the second sound generator 220 may be connected to the second-B connector 152*b* of the control circuit board 160 through the first cable hole CH1 defined in the lower chassis 180. In an embodiment, the second sound circuit board 252 connected to the third sound generator 230 may be connected to another second-B connector 152*b* of the control circuit board 160 through the second cable hole CH2 defined in the lower chassis 180. The first cable hole CH1 may be formed between one side of the control circuit board 160 and the second sound generator 220 when seen in a plan view. The second cable hole CH2 may be disposed between the other side of the control circuit board 160 and the third sound generator 230 when seen in a plan view.

A first blocking member 191, a second blocking member 192, and a third blocking member 193 may serve to block the propagation of vibration of the display panel 110 generated by the sound generators 210, 220, and 230 or block the transmission of a sound generated by the vibration of the display panel 110. The first blocking member 191, the second blocking member 192, and the third blocking member 193 may be attached to one surface of the heat radiation film 130 and the other surface of the lower chassis 180. Alternatively, the heat radiation film 130 is omitted, and the first blocking member 191, the second blocking member 192 and the third blocking member 193 may be attached to one surface of the first substrate 111 and the other surface of the lower chassis 180.

In an embodiment, the first blocking member 191 may be disposed on four side edges of the heat radiation film 130 as shown in FIG. 2. The second blocking member 192 may extend in the second direction (Y-axis direction), and may be disposed between the first sound generator 210 and the second sound generator 220. The third blocking member 193 may extend in the second direction (Y-axis direction), and may be disposed between the first sound generator 210 and the third sound generator 230. Thus, the vibration plane of the display panel 110 may be divided into three areas A1, A2, and A3 as shown in FIG. 2.

The first sound generator 210 may be disposed in the first area A1 surrounded by the first blocking member 191, the second blocking member 192, and the third blocking member 193. The second sound generator 220 may be disposed in the second area A2 surrounded by the first blocking member 191 and the second blocking member 192. The third sound generator 230 may be disposed in the third area A3 surrounded by the first blocking member 191 and the third blocking member 193. Since the first sound generator 210, the second sound generator 220 and the third sound generator 230 are disposed in different areas A1, A2 and A3 surrounded by the first blocking member 191, the second blocking member 192 and the third blocking member 193, it may be reduced that the vibration of the display panel 110 generated by the first sound generator 210, the vibration of the display panel 110 generated by the second sound generator 220, and the vibration of the display panel 110 generated by the third sound generator 230 influence each other.

The first sound generator 210, the second sound generator 220 and the third sound generator 230 may be disposed in different areas by the first blocking member 191, the second blocking member 192 and the third blocking member 193. In one embodiment, for example, as shown in FIG. 2, the first sound generator 210 may be disposed in the first area A1, the second sound generator 220 may be disposed in the second area A2, and the third sound generator 230 may be disposed in the third area A3. Therefore, in such an embodiment, the first sound generator 210 may output a first sound of a low frequency band by vibrating the first area A1 of the display panel 110. In such an embodiment, the second sound generator 220 may output a second sound, which is a right stereo sound of a high frequency band, by vibrating the second area A2 of the display panel 110. In such an embodiment, the third sound generator 230 may output a third sound, which is a left stereo sound of a high frequency band, by vibrating the third area A3 of the display panel 110. Accordingly, in such an embodiment, the display device 10 may provide a stereo sound of a 2.1 channel to the user.

In an embodiment, as shown in FIG. 4B, each of the first blocking member 191, the second blocking member 192, and the third blocking member 193 may include a base film 191a, a buffer layer 191b, a sacrificial layer 191c, a first adhesive layer 191d, and a second adhesive layer 191e.

The base film 191a may include or be formed of a plastic. In one embodiment, for example, the base film 191a may be formed of PET, but the material thereof is not limited thereto.

The buffer layer 191b may be disposed on one surface of the base film 191a. The buffer layer 191b may include or be formed of a foam having elasticity. In one embodiment, for example, the buffer layer 191b may be formed of polyurethane, silicone, a rubber, or an aerogel, but the material thereof is not limited thereto.

The sacrificial layer 191c may be disposed on one surface of the buffer layer 191b. In an embodiment, the sacrificial layer 191c serves to a layer which is separated in the case where the blocking member 190 is desired to be detached when the blocking member 190 is erroneously attached. In such an embodiment, a part of the first adhesive layer 191d and a part of the sacrificial layer 191c may remain on the other surface of the lower chassis 180. The sacrificial layer 191c may include or be formed of a material having low elasticity. In one embodiment, for example, the sacrificial layer 191c may include or be formed of polyurethane, but the material thereof is not limited thereto. Alternatively, the sacrificial layer 191c may be omitted.

The first adhesive layer 191d may be disposed on one surface of the sacrificial layer 191c. The first adhesive layer 191d may be attached to another surface (e.g., a surface opposite to the one surface) of the lower chassis 180. The second adhesive layer 191e may be disposed on the another surface of the second base film 201. The second adhesive layer 191e may be attached to one surface of the heat radiation film 130. The first adhesive layer 191d and the second adhesive layer 191e may be an acrylic adhesive or a silicone adhesive, but are not limited thereto.

In an embodiment, as shown in FIGS. 10 and 11, the first sound generator 210 may be an exciter for vibrating the display panel 110 by generating a magnetic force using a voice coil. In an embodiment, as shown in FIGS. 12 and 13, each of the second sound generator and the second sound generator may be a piezoelectric element or piezoelectric actuator for vibrating the display panel 110 using a piezoelectric material that contracts and expands based on the applied voltage. The first sound outputted by vibrating the display panel 110 using the first sound generator 210 may be a sound of a low frequency band. Therefore, the vibration displacement of the display panel 110 generated by the first sound generator 210 may be larger than the vibration displacement of the display panel 110 generated by the second sound generator device 220 or the vibration displacement of the display panel 110 generated by the third sound generator device 230. When the vibration displacement of the display panel 110 generated by the first sound generator 210 may be large, the vibration of the display panel 110 may be recognized by a viewer.

In an embodiment, a vibration damping member 400 may be disposed on one surface of the display panel 110, and the first sound generator 210 may be disposed on the vibration damping member 400 to reduce the vibration displacement of the display panel 110 generated by the first sound generator 210. The vibration damping member 400 may be attached onto the heat radiation film 130 disposed on the second surface of the first substrate 111. The first sound generator 210 may be disposed at the center of the vibration damping member 400. The vibration damping member 400 may not overlap the second sound generator 220 and the third sound generator 230 in the thickness direction of the display panel 110.

Figure 6:
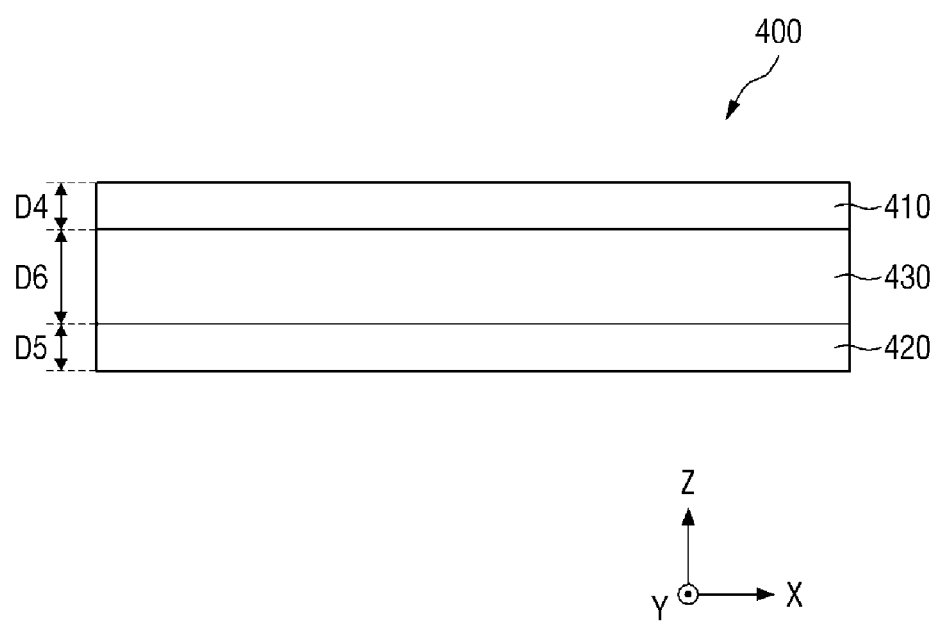
FIG. 6 is a side view showing an embodiment of a vibration damping member.

The vibration damping member 400 may have high rigidity. Rigidity refers to the degree of resistance to deformation when the vibration damping member 400 receives a load and deforms. The vibration damping member 400 may include a metal material having low density to have high rigidity. In one embodiment, for example, the vibration damping member 400 may be an aluminum metal sheet, or may be a composite steel sheet including a first metal plate 410, a second metal plate 420, and an adhesive layer 430 disposed between the first metal plate 410 and the second metal plate 420, as shown in FIG. 6. In such an embodiment, since the rigidity of the composite steel sheet is proportional to an elastic force, the thickness D6 of the adhesive layer 430 may be greater than the thickness D4 of the first metal plate 410 and the thickness D5 of the second metal plate 420 to increase the elastic force.

The vibration damping member 400 may have a rectangular shape in a plan view. The corners of the vibration damping member 400 may be formed in a round shape having a curvature in a plan view. In an embodiment, as shown in FIG. 2, where the bobbin 212 of the first sound generator 210 is formed in a circular shape in a plan view, the vibration generated by the first sound generator 210 may be spread in a circular shape in a plan view. In an embodiment, where the corners of the vibration damping member 400 is formed in a rectangular shape in a plan view, the shape of spreading vibration is different from the shape of the corner of the vibration damping member 400, such that vibration may be substantially reduced at the corners of the vibration damping member 400 or the form of vibration may be deformed. In a case where the corners of the vibration damping member 400 are formed in a round shape having a curvature, the vibration generated by the first sound generator 210 may be spread as it is. The curvature of each of the corners of the vibration damping member 400 may be substantially equal to the curvature of the bobbin 212 of the first sound generator 210.

The vibration damping member 400 may be disposed in the first area A1 surrounded by the first blocking member 191, the second blocking member 192, and the third blocking member 193. The area of the vibration damping member 400 may be smaller than the area of the first area A1. The vibration damping member 400 may not be disposed in the second area A2 surrounded by the first blocking member 191 and the second blocking member 192 and in the third area A3 surrounded by the first blocking member 191 and the third blocking member 193.

In an embodiment, as shown in FIG. 2 that the length L1 of the vibration damping member 400 in the first direction (X-axis direction) is substantially the same as the length L2 of the vibration damping member 400 in the second direction (Y-axis direction), but the invention is not limited thereto. Alternatively, the length L1 of the vibration damping member 400 in the first direction (X-axis direction) may be different from the length L2 of the vibration damping member 400 in the second direction (Y-axis direction). In an embodiment, as shown in FIG. 4A, the vibration damping member 400 may overlap the control circuit board 160 in the third direction (Z-axis direction) which is the thickness direction of the display panel 110.

According to an embodiment shown in FIGS. 2 to 5, since the vibration damping member 400 having high rigidity is disposed between the display panel 110 and the first sound generator 210, the vibration displacement of the display panel 110 generated by the first sound generator 210 may be reduced such that the vibration of the display panel 110 may be effectively prevented from being recognized by a viewer seeing an image displayed thereon.

According to an embodiment shown in FIGS. 2 to 5, since the first sound circuit board 251 connected to the second sound generator 220 is connected to the control circuit board 160 through the first cable hole CH1 defined in the lower chassis 180, even when the second sound generator 220 is disposed on one surface of the heat radiation film 130 and the control circuit board 160 is disposed on one surface of the lower chassis 180, the control circuit board 160 and the second sound generator 220 may be effectively electrically connected to each other.

Figure 7:
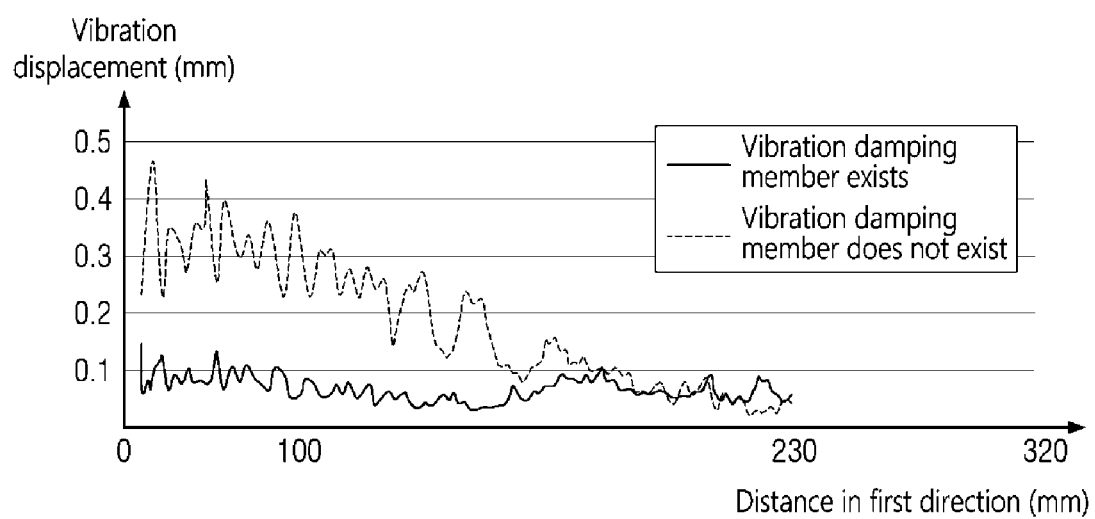
FIG. 7 is a graph showing the vibration displacement of the display panel by a first sound generator according to the presence or absence of the vibration damping member.

FIG. 7 is a graph showing the vibration displacement of the display panel by the first sound generator according to the presence or absence of the vibration damping member.

In FIG. 7, X-axis indicates a length from the center of the first sound generator 210 in the first direction (X-axis direction) or the second direction (Y-axis direction), and Y-axis indicates a vibration displacement of the display panel 110.

Referring to FIG. 7, in a case where the vibration damping member 400 is omitted, the vibration displacement of the display panel 110 in the third direction (Z-axis direction) may be at most about 0.45 millimeter (mm). In contrast, in a case where the vibration damping member 400 is disposed between the display panel 110 and the first sound generator 210, the vibration displacement of the display panel 110 in the third direction (Z-axis direction) may be at most about 0.15 mm. The difference in vibration displacement of the display panel 110 in the third direction (Z-axis direction) may be at most about 0.3 mm according to the presence or absence of the vibration damping member 400. That is, as shown in FIG. 7, the vibration displacement of the display panel 110 generated by the first sound generator 210 may be reduced due to the vibration damping member 400.

Figure 8:
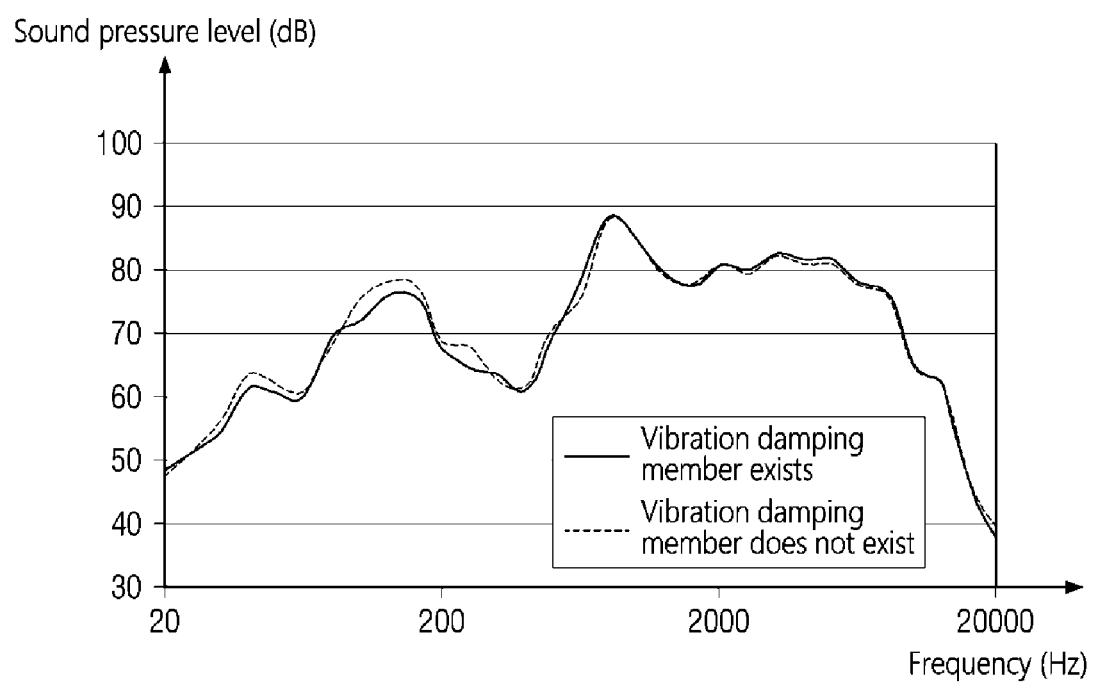
FIG. 8 is a graph showing the sound pressure level with respect to the frequency of a first sound according to the presence or absence of the vibration damping member.

FIG. 8 is a graph showing the sound pressure level with respect to the frequency of a first sound according to the presence or absence of the vibration damping member.

In FIG. 8, X-axis indicates a frequency of a first sound output by vibrating the display panel 110 using the first sound generator 210, and Y-axis indicates a sound pressure level of the first sound.

Referring to FIG. 8, in a case where the vibration damping member 400 is omitted and when the vibration damping member 400 is disposed between the display panel 110 and the first sound generator 210, there is little difference in sound pressure level of the first sound according to frequency. That is, since the vibration damping member 400 disperses the force of vibrating the display panel 110 by the first sound generator 210 to reduce the vibration displacement of the display panel 110, the sound pressure level of the first sound according to frequency is not reduced even when the vibration displacement of the display panel 110 generated by the first sound generator 210 is reduced. Accordingly, the vibration energy applied to the display panel 110 by the first sound generator 210 may be maintained substantially as it is.

FIG. 9 is a cross-sectional showing an embodiment of a first substrate, a second substrate, and a pixel array layer of a display panel.

Referring to FIG. 9, an embodiment of the display panel 110 may include a first substrate 111, a second substrate 112, and a pixel array layer 113. The pixel array layer 113 may include a thin film transistor layer TFTL and a light emitting element layer EML.

A buffer film 302 may be disposed on one surface of the first substrate 111 facing the second substrate 112. The buffer film 302 may be disposed on the first substrate 111 to protect the thin film transistors 335 and the light emitting elements from moisture permeating through the first substrate 111 that is vulnerable to moisture permeation. The buffer film 302 may include or be formed of a plurality of alternately laminated inorganic films. In one embodiment, for example, the buffer film 302 may be a multilayer film in which one or more inorganic films of a silicon oxide film (SiOx), a silicon nitride film (SiNx), and a SiON film are alternately laminated. Alternatively, the buffer film may be omitted.

The thin film transistor layer TFTL is disposed on the buffer film 302. The thin film transistor layer TFTL includes thin film transistors 335, a gate insulating film 336, an interlayer insulating film 337, a protective film 338, and a planarization film 339.

The thin film transistor 335 is disposed on the buffer film 302. The thin film transistor 335 includes an active layer 331, a gate electrode 332, a source electrode 333, and a drain electrode 334. Although it is illustrated in FIG. 9 that the thin film transistor 335 has a top gate structure in which the gate electrode 332 is located over the active layer 331, but the invention is not limited thereto. That is, the thin film transistors 335 may have a bottom gate structure in which the gate electrode 332 is located under the active layer 331 or in a double gate structure in which the gate electrode 332 is located both over and under the active layer 331.

The active layer 331 is disposed on the buffer film 302. The active layer 331 may include or be formed of a silicon-based semiconductor material or an oxide-based semiconductor material. A light blocking layer for blocking external light incident on the active layer 331 may be disposed between the buffer film and the active layer 331.

The gate insulating film 336 may be disposed on the active layer 331. The gate insulating film 316 may include or be formed of an inorganic film, for example, a silicon oxide film (SiOx), a silicon nitride film (SiNx), or a multilayer film thereof.

The gate electrode 332 and the gate line may be disposed on the gate insulating film 316. The gate electrode 332 and the gate line may include or be formed of a single layer or multiple layers including any one of molybdenum (Mo), aluminum (Al), chromium (Cr), gold (Au), titanium (Ti), nickel (Ni), neodymium (Nd), and copper (Cu), or an alloy thereof.

The interlayer insulating film 337 may be disposed on the gate electrode 332 and the gate line. The interlayer insulating film 337 may include or be formed of an inorganic film, for example, a silicon oxide film (SiOx), a silicon nitride film (SiNx), or a multilayer film thereof.

The source electrode 333, the drain electrode 334 and the data line may be disposed on the interlayer insulating film 337. Each of the source electrode 333 and the drain electrode 334 may be connected to the active layer 331 through a contact hole defined through the gate insulating film 336 and the interlayer insulating film 337. The source electrode 333, the drain electrode 334 and the data line may have a single layer structure or a multilayer structure with one or more layers, each including molybdenum (Mo), aluminum (Al), chromium (Cr), gold (Au), titanium (Ti), nickel (Ni), neodymium (Nd), and copper (Cu), or a combination (e.g., an alloy) thereof.

The protective film 338 for insulating the thin film transistor 335 may be disposed on the source electrode 333, the drain electrode 334, and the data line. The protective film 338 may include or be formed of an inorganic film, for example, a silicon oxide film (SiOx), a silicon nitride film (SiNx), or a multilayer film thereof.

The planarization film 339 may be disposed on the protective film 338 to planarize a step due to the thin film transistor 335. The planarization film 339 may include or be formed of an organic film including an acryl resin, an epoxy resin, a phenolic resin, a polyamide resin, or a polyimide resin.

The light emitting element layer EML is disposed on the thin film transistor layer TFTL. The light emitting element layer EML includes light emitting elements and a pixel defining film 344.

The light emitting elements and the pixel defining film 344 are disposed on the planarization film 339. In an embodiment, the light emitting element may be an organic light emitting element. In such an embodiment, the light emitting element may include an anode electrode 341, light emitting layers 342, and a cathode electrode 343.

The anode electrode 341 may be disposed on the planarization film 339. The anode electrode 341 may be connected to the source electrode 333 of the thin film transistor 335 through a contact hole defined through the protective film 338 and the planarization film 339.

The pixel defining film 344, which defines pixels, may be disposed on the planarization film 339 to cover the edges of the anode electrode 341. That is, the pixel defining film 344 serves to define sub-pixels PX1, PX2, and PX3. Each of the sub-pixels PX1, PX2 and PX3 has a structure in which the anode electrode 341, the light emitting layer 342, and the cathode electrode 343 are sequentially laminated one on another, and thus holes from the anode electrode 341 and electrons from the cathode electrode 343 are combined with each other in the light emitting layer 342 to emit light.

The light emitting layers 342 are disposed on the anode electrode 341 and the pixel defining film 344. The light emitting layer 342 may be an organic light emitting layer. The light emitting layer 342 may emit light having a short wavelength such as blue light or ultraviolet light. The peak wavelength range of blue light may be about 450 nanometers (nm) to 490 nm, and the peak wavelength range of ultraviolet light may be less than 450 nm. In an embodiment, the light emitting layer 342 may be a common layer formed commonly for or to cover the sub-pixels PX1, PX2, and PX3. In such an embodiment, the display panel 110 may include an optical wavelength conversion layer (not shown) for converting light of a short wavelength such as blue light or ultraviolet light emitted from the light emitting layer 342 into red light, green light, and blue light, and a color filter layer CFL for transmitting red light, green light, and blue light.

The light emitting layer 342 may include a hole transporting layer, a light emitting layer, and an electron transporting layer. Further, the light emitting layer 342 may be in a tandem structure of two stacks or more, and in this case, a charge generating layer may be formed between the stacks.

The cathode electrode 343 is disposed on the light emitting layer 342. The cathode electrode 343 may be disposed to cover the light emitting layer 342. The cathode electrode 343 may be a common layer formed commonly in the pixels.

The light emitting element layer EML is formed in a top emission manner in which light is emitted in a direction toward the second substrate 112, that is, in an upward direction. In such an embodiment, the anode electrode 341 may include or be formed of a high-reflectance metal material such as a laminate structure (Ti/Al/Ti) of aluminum and titanium, a laminate structure (ITO/Al/ITO) of aluminum and indium tin oxide ("ITO"), an APC alloy, or a laminate structure (ITO/APC/ITO) of an APC alloy and ITO. The APC alloy may be an alloy of silver (Ag), palladium (Pd), and copper alloy (Cu). The cathode electrode 263 may include or be formed of a transparent conductive material ("TCO") such as ITO or indium zinc oxide ("IZO"), which is light-transmissive, or a semi-transmissive conductive material such as magnesium (Mg), silver (Ag), or an alloy of magnesium (Mg) and silver (Ag). In an embodiment, where the cathode electrode 343 is formed of a semi-transmissive conductive material, light emission efficiency may be increased by microcavity effects.

The encapsulation layer 345 is disposed on the light emitting element layer EML. The encapsulation layer 305 serves to prevent oxygen or moisture from permeating the light emitting layer 342 and the cathode electrode 343. In such an embodiment, the encapsulation layer 345 may include at least one inorganic film. The inorganic film may include or be formed of silicon nitride, aluminum nitride, zirconium nitride, titanium nitride, hafnium nitride, tantalum nitride, silicon oxide, aluminum oxide, or titanium oxide. The encapsulation layer 345 may further include at least one organic film. The organic film may be formed to have a sufficient thickness to prevent foreign matter (particles) from penetrating the encapsulation layer 305 and entering the light emitting layer 342 and the cathode electrode 343. The organic film may include at least one of epoxy, acrylate and urethane acrylate.

The color filter layer CFL is disposed on one surface of the second substrate 112 facing the first substrate 111. The color filter layer CFL may include a black matrix 360 and color filters 370.

The black matrix 360 may be disposed on one surface of the second substrate 112. The black matrix 360 may be disposed not to overlap the sub-pixels PX1, PX2, and PX3 but to overlap the pixel defining film 344. The black matrix 360 may include a black dye that may block light without transmitting the light, or may include an opaque metal material.

The color filters 370 may be arranged to overlap the sub-pixels PX1, PX2, and PX3. In an embodiment, first color filters 371 may be arranged to overlap the first sub pixels PX1, second color filters 372 may be arranged to overlap the second sub-pixels PX2, and third color filters 373 may be arranged to overlap the third sub-pixels PX3. In such an embodiment, the first color filter 371 may be a light transmitting filter of a first color that transmits light of the first color, the second color filter 372 may be a light transmitting filter of a second color that transmits light of the second color, and the third color filter 373 may be a light transmitting filter of a third color that transmits light of the third color. In one embodiment, for example, the first color may be red, the second color may be green, and the third color may be blue, but the invention is not limited thereto. In such an embodiment, the peak wavelength range of red light transmitted through the first color filter 371 may be about 620 nm to about 750 nm, the peak wavelength range of green light transmitted through the second color filter 372 may be about 500 nm to about 570 nm, and the peak wavelength range of blue light transmitted through the third color filter 373 may be about 450 nm to about 490 nm.

The edges of the two color filters adjacent to each other may overlap the black matrix 360. Thus, the color mixture that may occur when light emitted from the light emitting layer 342 of any one sub-pixel moves to the color filter of the sub-pixel adjacent thereto may be effectively prevented by the black matrix 360.

An overcoat layer may be disposed on the color filters 370 to planarize a step due to the color filters 370 and the black matrix 360. Alternatively, the overcoat layer may be omitted.

The optical wavelength conversion layer QDL is disposed on the color filter layer CFL. The optical wavelength conversion layer QDL may include a first capping layer 351, a first wavelength conversion layer 352, a second wavelength conversion layer 353, a third wavelength conversion layer 354, a second capping layer 355, an interlayer organic film 356, and a third capping layer 357.

The first capping layer 351 may be disposed on the color filter layer CFL. The first capping layer 351 serves to prevent external moisture or oxygen from penetrating the first wavelength conversion layer 352, the second wavelength conversion layer 353, and the third wavelength conversion layer 354 through the color filter layer CFL. The first capping layer 351 may include or be formed of an inorganic film including silicon nitride, aluminum nitride, zirconium nitride, titanium nitride, hafnium nitride, tantalum nitride, silicon oxide, aluminum oxide, or titanium oxide.

The first wavelength conversion layer 352, the second wavelength conversion layer 353, and the third wavelength conversion layer 354 may be arranged on the first capping layer 351.

The first wavelength conversion layer 352 may be disposed to overlap the first sub-pixel PX1. The first wavelength conversion layer 352 may convert short-wavelength light such as blue light or ultraviolet light emitted from the light emitting layer 342 of the first sub-pixel PX1 into light of the first color. In an embodiment, the first wavelength conversion layer 352 may include a first base resin, a first wavelength shifter, and a first scatterer.

In an embodiment, the first base resin is a material having high light transmittance and high dispersion characteristics for the first wavelength shifter and the first scatterer. In one embodiment, for example, the first base resin may include an organic material such as an epoxy resin, an acrylic resin, a cardo-based resin, or an imide resin.

The first wavelength shifter may convert or shift the wavelength range of the incident light. The first wavelength shifter may be a quantum dot, a quantum rod, or a phosphor. In an embodiment, where the first wavelength shifter is a quantum dot, the first wavelength shifter may have a specific band gap depending on its composition and size as a semiconductor nanocrystal material. Therefore, the first wavelength shifter may absorb incident light and then emit light having a specific wavelength. In an embodiment, the first wavelength shifter may have a core-shell structure including a core including nanocrystals and a shell surrounding the core. In such an embodiment, the nanocrystals constituting the core may include IV group nanocrystals, II-VI group compound nanocrystals, III-V group compound nanocrystals, IV-VI group nanocrystals, or a combination thereof, for example. The shell may serve as a protective layer for preventing the chemical denaturation of the core to maintain semiconductor characteristics and/or as a charging layer for imparting electrophoretic characteristics to the quantum dots. The shell may have a single layer structure or a multilayer structure, and the shell may include a metal or nonmetal oxide, a semiconductor compound, or a combination thereof, for example.

The first scatterer may have a different refractive index different from the first base resin, and may form an optical interface together with the first base resin. In one embodiment, for example, the first scatterer may be light scattering particles. In one embodiment, for example, the first scatterer may be metal oxide particles such as titanium oxide ($TiO_2$) particles, silicon oxide ($SiO_2$) particles, zirconium oxide ($ZrO_2$) particles, aluminum oxide ($Al_2O_3$) particles, indium oxide ($In_2O_3$) particles, or zinc oxide (ZnO) particles. Alternatively, the first scatterer may be organic particles such as acrylic resin particles or urethane resin particles.

The first scatterer may scatter incident light in a random direction without substantially changing the wavelength of light passing through the first wavelength conversion layer 352. Accordingly, since the length of a path of light passing through the first wavelength conversion layer 352 may be increased, the color conversion efficiency by the first wavelength shifter may be increased.

In an embodiment, the first wavelength conversion layer 352 may overlap the first color filter 371. Therefore, a part of short-wavelength light such as blue light or ultraviolet light provided from the first sub-pixel PX1 may not be converted into light of the first color by the first wavelength shifter, but may be directly transmitted through the first wavelength conversion layer 352. However, short wavelength light such as blue light or ultraviolet light, which is not converted by the first wavelength conversion layer 352 and is incident on the first color filter 371, may not be transmitted through the first color filter 371. In contrast, the light of the first color converted by the first wavelength conversion layer 352 may be transmitted through the first color filter 371 and emitted toward the second substrate 112.

The second wavelength conversion layer 353 may be disposed to overlap the second sub-pixel PX2. The second wavelength conversion layer 353 may convert short-wavelength light such as blue light or ultraviolet light emitted from the light emitting layer 342 of the second sub-pixel PX2 into light of the second color. In an embodiment, the second wavelength conversion layer 353 may include a second base resin, a second wavelength shifter, and a second scatterer. Since the second base resin, second wavelength shifter and second scatterer of the second wavelength conversion layer 353 are substantially the same as those described with respect to the first wavelength conversion layer 352, any repetitive detailed description thereof will be omitted. In an embodiment, where the first wavelength shifter and the second wavelength shifter are quantum dots, the diameter of the second wavelength shifter may be smaller than the diameter of the first shifter diameter.

In an embodiment, the second wavelength conversion layer 353 may overlap the second color filter 372. Therefore, a part of short-wavelength light such as blue light or ultraviolet light provided from the second sub-pixel PX2 may not be converted into light of the second color by the second wavelength shifter, but may be directly transmitted through the second wavelength conversion layer 353. However, short wavelength light such as blue light or ultraviolet light, which is not converted by the second wavelength conversion layer 353 and is incident on the second color filter 372, may not be transmitted through the second color filter 372. In contrast, the light of the second color converted by the second wavelength conversion layer 353 may be transmitted through the second color filter 372 and emitted toward the second substrate 112.

The third wavelength conversion layer 354 may be disposed to overlap the third sub-pixel PX3. The third wavelength conversion layer 354 may convert short-wavelength light such as blue light or ultraviolet light emitted from the light emitting layer 342 of the third sub-pixel PX3 into light of the third color. For this purpose, the third wavelength conversion layer 354 may include a third base resin and a third scatterer. Since the third base resin and third scatterer of the third wavelength conversion layer 354 are substantially the same as those described with respect to the first wavelength conversion layer 352, any repetitive detailed description thereof will be omitted.

In an embodiment, the third wavelength conversion layer 354 may overlap the third color filter 373. Therefore, short-wavelength light such as blue light or ultraviolet light provided from the third sub-pixel PX3 may be directly transmitted through the third wavelength conversion layer 354, and the light having passed through the third wavelength conversion layer 354 may be transmitted through the third color filter 373 and emitted toward the second substrate 112.

The second capping layer 355 may be disposed on the first wavelength conversion layer 352, the second wavelength conversion layer 353, the third wavelength conversion layer 354, and the first capping layer 351 exposed without being covered by the first to third wavelength conversion layers 352, 353, and 354. The second capping layer 355 serves to prevent external moisture or oxygen from penetrating the first wavelength conversion layer 352, the second wavelength conversion layer 353, and the third wavelength conversion layer 354. The second capping layer 355 may include or be formed of an inorganic film including silicon nitride, aluminum nitride, zirconium nitride, titanium nitride, hafnium nitride, tantalum nitride, silicon oxide, aluminum oxide, or titanium oxide.

The interlayer organic film 356 may be disposed on the second capping layer 355. The interlayer organic film 356 may be a planarization layer for planarizing a step due to the wavelength conversion layers 352, 353, and 354. The interlayer organic film 356 may be an organic film such as an acryl resin film, an epoxy resin film, a phenolic resin film, a polyamide resin film, or a polyimide resin film.

The third capping layer 357 may be disposed on the interlayer organic film 356. The third capping layer 357 may include or be formed of an inorganic film including silicon nitride, aluminum nitride, zirconium nitride, titanium nitride, hafnium nitride, tantalum nitride, silicon oxide, aluminum oxide, or titanium oxide.

The filler FL may be disposed between the thin film encapsulation layer TFEL disposed on the first substrate 111 and the third capping layer 357 disposed on the second substrate 112. The filler FL may include or be made of a material having a buffering function. In one embodiment, for example, the filler FL may be an organic film such as an acryl resin film, an epoxy resin film, a phenolic resin film, a polyamide resin film, or a polyimide resin film.

In an embodiment, a sealing material for attaching the first substrate 111 to the second substrate 112 may be disposed in the non-display area of the display panel 110, and the filler FL may be surrounded by the sealing material when viewed on the plane. The sealing material may be a glass frit or a sealant.

According to an embodiment shown in FIG. 9, the first to third sub-pixels PX1, PX2 and PX3 emit short-wavelength light such as blue light or ultraviolet light. In such an embodiment, the light of the first sub-pixel PX1 may be converted into light of the first color through the first wavelength conversion layer 352 and then output through the first color filter CF1, the light of the second sub-pixel PX1 may be converted into light of the second color through the second wavelength conversion layer 353 and then output through the second color filter CF2, and the light of the third sub-pixel PX3 may be output through the third wavelength conversion layer 354 and the third color filter CF3, so that white light may be output.

In an embodiment, where the sub-pixels PX1, PX2, and PX3 has a top emission manner in which light is emitted toward the second substrate 112, that is, in an upward direction, as shown in FIG. 9, the heat radiation film 130 including an opaque material such as graphite or aluminum may be disposed on one surface of the first substrate 111.

FIGS. 10 and 11 are exemplary views showing the vibration of the display panel by the first sound generator.

Referring to FIGS. 10 and 11, an embodiment of the first sound generator 210 may be an exciter for vibrating the display panel 110 by generating a magnetic force using a voice coil. In such an embodiment, a hole may be defined or formed in an area where the first sound generator 210 is disposed in the lower chassis 180.

The first sound generator 210 may include a magnet 211, a bobbin 212, a voice coil 213, a damper 214, a plate 215, a first fixing members 216, and second fixing members 217.

The magnet 211 may be a permanent magnet, and a sintered magnet such as barium ferrite may be used as the magnet 211. The magnet 211 may be a ferric trioxide ($Fe_2O_3$) magnet, a barium carbonate ($BaCO_3$) magnet, a neodymium magnet, or an alloy cast magnet of strontium ferrite having improved magnetic properties, aluminum (Al), nickel (Ni), or cobalt (Co), but is not limited thereto. The material of neodymium magnet may be, for example, neodymium-iron-boron (Nd—Fe—B).

The magnet 211 may include a flat portion 211a, a central protrusion portion 211b protruding from the center of the flat portion 211a, and a side wall portion 211c protruding from the edge of the flat portion 211a. The central protrusion portion 211b and the side wall portion 211c may be spaced apart from each other by a predetermined distance, and thus a predetermined space may be formed between the central protrusion portion 211b and the side wall portion 211c. In an embodiment, the magnet 211 has a cylindrical shape, and a circular space may be formed at a bottom surface of the cylindrical shape.

The central protrusion portion 211b of the magnet 211 may have magnetic properties of the N pole, and the flat portion 211a and the sidewall portion 211c may have magnetic properties of the S pole, so that an external magnetic field may be formed between the central protrusion portion 211b and plate 215 of the magnet 211 and between the central protrusion portion 211b and side wall portion 211c of the magnet 211.

The bobbin 212 may be in a cylindrical shape. The central protrusion portion 211b of the magnet 211 may be disposed inside the bobbin 212. In an embodiment, the bobbin 212 may be disposed to surround the central protrusion portion 211b of the magnet 211. In such an embodiment, the side wall portion 211c of the magnet 211 may be disposed outside the bobbin 212. In such an embodiment, the side wall portion 211c of the magnet 211 may be disposed to surround the bobbin 212. A space may be formed between the bobbin 212 and the central protrusion portion 211b of the magnet 211 and between the bobbin 212 and the side wall portion 211c of the magnet 211.

The bobbin 212 may include or be formed of a pulp or paper processed material; aluminum, magnesium, or an alloy thereof; synthetic resin such as polypropylene; or polyamide-based fiber. One end of the bobbin 212 may be bonded to the heat radiation film 130 using an adhesive member. The adhesive member may be a double-sided tape.

The voice coil 213 is wound (or rolled) on the outer peripheral surface of the bobbin 212. One end of the voice coil 213 may be electrically connected to the first sound wiring WL1, and the other end thereof may be electrically connected to the second sound wiring WL2. Thus, the voice coil 213 may receive a first-A driving voltage (or a first first driving voltage) and a first-B driving voltage (or a second first driving voltage) from the sound driving circuit 171.

The damper 214 is disposed between the bobbin 212 and the plate 215. One side of the damper 214 may be fixed to the bobbin 212, and the other side thereof may be fixed to the plate 215 by a second fixing member 217 such as a screw. Each of the second fixing members 217 may be inserted into and fixed to the damper hole of the damper 214 and the second fixing hole of the plate 215. The damper hole of the damper 214 and the second fixing hole of the plate 215 may be screw holes into which the screw can be fixed. The damper hole of the damper 214 may be a hole defined through the damper 214, and the second fixing hole of the plate 215 may be a hole defined through the plate 215 or a hole formed by boring a part of the plate 215.

The damper 214 may have elasticity, and may include or be formed of a conductive material. The damper 214 regulates the vertical vibration of the bobbin 212 while contracting and relaxing in accordance with the vertical movement of the bobbin 212. In such an embodiment, since the damper 214 is connected to the bobbin 212 and the plate 215, the vertical movement of the bobbin 212 may be restricted by the restoring force of the damper 214. In one embodiment, for example, when the bobbin 212 vibrates at a predetermined height or higher, or vibrates at a predetermined height or lower, the bobbin 212 may be restored to its original position by the restoring force of the damper 214.

The plate 215 may be disposed on the lower surface of the magnet 211. The plate 215 may be integrally formed with the magnet 211 as a single unitary unit or may be formed separately from the magnet 211. In an embodiment, where the plate 215 is formed separately from the magnet 211, the magnet 211 may be attached to the plate 215 through an adhesive member such as a double-sided tape. The plate 215 may be fixed to the lower chassis 180 through a fixing member 216 such as a screw.

The fixing direction of each of the first fixing members 216 and the fixing direction of each of the second fixing members 217 may be opposite to each other. In one embodiment, for example, as shown in FIGS. 10 and 11, each of the first fixing members 216 may be fixed in the second direction (Y-axis direction), whereas each of the second fixing members 217 may be fixed in the opposite direction of the second direction (Y-axis direction).

The plate 215 may have a bent shape between an area 215a, in which the magnet 211 is disposed, and an area 215b, in which the first fixing members 216 and the second fixing members 217 are disposed. The area 215a in which the magnet 211 is disposed may be concave compared to the area 215b in which the first fixing members 216 and the second fixing members 217 are disposed. Thus, the distance between the area 215a in which the magnet 211 is disposed and the area 215b in which the first fixing members 216 and the second fixing members 217 are disposed may be greater than the area 215b in which the first fixing members 216 and the second fixing members 217 are disposed and the first substrate 111 or the heat radiation film 130. Thus, even when the height of the first sound generator 210 is not reduced, the distance between the lower chassis 180 and the first substrate 111 may be minimized, and thus the thickness of the display device 10 may be reduced. The height of the first sound generator 210 indicates a distance between one end of the bobbin 212 contacting the heat radiation film 130 and the plate 215 contacting the magnet 211.

One end of the voice coil 213 may be electrically connected to the sound driving circuit 171 through the first sound wiring WL1, thereby receiving the first-A driving voltage from the sound driving circuit 171. The other end of the voice coil 213 may be electrically connected to the sound driving circuit 171 through the second sound wiring WL2, thereby receiving the first-B driving voltage from the sound driving circuit 171. A current may flow through the voice coil 213 in response to the first driving voltage and the first driving voltage. An applied magnetic field may be formed around the voice coil 213 in accordance with the current flowing through the voice coil 213. When the first-A driving voltage is a positive polarity voltage and the first-B driving voltage is a negative polarity voltage and when the first-A driving voltage is a negative polarity voltage and the first-B driving voltage is a positive polarity voltage, the direction of the current flowing through the voice coil 213 is reversed. Therefore, the N pole and S pole of the applied magnetic field formed around the voice coil 213 are changed according to the alternate current ("AC") driving of the first-A driving voltage and the first-B driving voltage, and thus attractive force and repulsive force are alternately applied to the magnet 211 and the voice coil 213. Therefore, the bobbin 212 on which the voice coil 213 is wound may reciprocate in the third direction (Z-axis direction) as shown in FIGS. 10 and 11. Accordingly, the display panel 110 vibrates in the third direction (Z-axis direction) as shown in FIGS. 10 and 11, and thus a sound may be output.

In an embodiment, as described above, the magnet 211 and the plate 215 are fixed to the lower chassis 180, but the embodiment of the invention is not limited thereto. Alternatively, the magnet 211 and the plate 215 may be fixed to a system circuit board, a power supply circuit board, or a dummy circuit board instead of the lower chassis 180. In such an embodiment, a hole corresponding to the hole H of the lower chassis 180 may be defined or formed in the control circuit board 160, the system circuit board, the power supply circuit board, or the dummy circuit board. The dummy circuit board refers to a circuit board in which components other than the magnet 211 and plate 215 of the first sound generator 210 and the amplifier for amplifying the first sound signal provided to the first sound generator 210 are not arranged. The dummy circuit board may be a flexible printed circuit board or a printed circuit board.

According to an embodiment, as shown in FIGS. 10 and 11, the bobbin 212 is fixed to the first substrate 111 or the heat radiation film 130, and the plate 215 to which the magnet 211 is coupled is fixed to the lower chassis 180. Since the lower chassis 180 supporting the magnet 211 is rigid as compared with the display panel 110, the bobbin 212 wound with the voice coil 213 may reciprocate from the fixed magnet 211 based on the applied magnetic field. The display panel 110 may be vibrated in the third direction (Z-axis direction) as shown in FIGS. 10 and 11 in accordance with the reciprocation of the bobbin 212, and thus a sound may be output.

According to an embodiment, as shown in FIGS. 10 and 11, the plate 215 may have a bent shape between an area 215*a* in which the magnet 211 is disposed and an area 215*b* in which the first fixing members 216 and the second fixing members 217 are disposed. Thus, even when the height of the first sound generator 210 is not reduced, the distance between the lower chassis 180 and the first substrate 111 may be minimized, and thus the thickness of the display device 10 may be reduced.

FIG. 12 is an exemplary view showing the vibration of the display panel by the second sound generator of FIG. 5, and FIG. 13 is an exemplary view showing a method of vibrating a vibration layer disposed between the first branch electrode and second branch electrode of a second sound generator.

Referring to FIGS. 12 and 13, an embodiment of the second sound generator 220 may be a piezoelectric element or a piezoelectric actuator that vibrates the display panel 110 by contracting or expanding based on an applied voltage. In one embodiment, for example, the second sound generator 220 may include a vibration layer 221, a first electrode 222, and a second electrode 223.

The first electrode 222 may include a first stem electrode 2221 and first branch electrodes 2222. In an embodiment, the first stem electrode 2221 may be disposed on at least one side surface of the vibration layer 221 as shown in FIG. 12. Alternatively, the first stem electrode 2221 may be disposed through a part of the vibration layer 221. The first stem electrode 2221 may be disposed on the upper surface of the vibration layer 221. The first branch electrodes 2222 may be branched from the first stem electrode 2221. The first branch electrodes 2222 may be arranged in parallel with each other.

The second electrode 223 may include a second stem electrode 2231 and second branch electrodes 2232. The second electrode 223 may be disposed to be spaced apart from the first electrode 222. Thus, the second electrode 223 may be electrically separated from the first electrode 222. In an embodiment, the second stem electrode 2231 may be disposed on at least one side surface of the vibration layer 221. In such an embodiment, the first stem electrode 2221 may be disposed on the first side surface of the vibration layer 221, and the second stem electrode 2231 may be disposed on the second side surface of the vibration layer 221. Alternatively, the second stem electrode 2231 may be disposed to penetrate a part of the vibration layer 221. The second stem electrode 2231 may be disposed on the upper surface of the vibration layer 221. The second branch electrodes 2232 may be branched from the second stem electrode 2231. The second branch electrodes 2232 may be arranged in parallel with each other.

The first branch electrodes 2222 and the second branch electrodes 2232 may be arranged in parallel to each other in the horizontal direction (X-axis direction or Y-axis direction). Further, the first branch electrodes 2222 and the second branch electrodes 2232 may be arranged alternately in the vertical direction (Z-axis direction). That is, the first branch electrodes 2222 and the second branch electrodes 2232 may be arranged repeatedly in order of the first branch electrode 2222, the second branch electrode 2232, the first branch electrode 2222, and the second branch electrode 2232 in the vertical direction (Z-axis direction).

The first electrode 222 and the second electrode 223 may be connected to the pads of the first sound circuit board 251 or the second sound circuit board 252. The pads of the first sound circuit board 251 or the second sound circuit board 252 may be electrically connected to the first electrode 222 and second electrode 223 disposed on one surface of the second sound generator 220.

The vibration layer 221 may be a piezoelectric element that is deformed based on a first driving voltage applied to the first electrode 222 and a second driving voltage applied to the second electrode 223. In an embodiment, the vibration layer 511 may be at least one of a poly vinylidene fluoride ("PVDF") film, a piezoelectric body of plumbum zirconate titanate ("PZT"), and an electroactive polymer.

Since the manufacturing temperature of the vibration layer 221 is high, each of the first electrode 222 and the second electrode 223 may include or be formed of silver (Ag) or an alloy of silver (Ag) and palladium (Pd) each having a high melting point. In an embodiment, where each of the first electrode 222 and the second electrode 223 is formed of an alloy of silver (Ag) and palladium (Pd), the content of silver (Ag) may be higher than the content of palladium (Pd) to increase the melting point of each of the first electrode 222 and the second electrode 223.

The vibration layer 221 may be disposed between the first branch electrodes 2222 and the second branch electrodes 2232. The vibration layer 221 contracts or expands based on a difference between the first driving voltage applied to the first branch electrode 2222 and the second driving voltage applied to the second branch electrode 2232.

In an embodiment, as shown in FIG. 13, when the polar direction of the vibration layer 221 disposed between the first branch electrode 2222 and the second branch electrode 2232 disposed under the first branch electrode 2222 is an upward direction (↑), the vibration layer 221 has a positive polarity in an upper area adjacent to the first branch electrode 2222 and has a negative polarity in a lower area adjacent to the second branch electrode 2232. In such an embodiment, as shown in FIG. 13, when the polar direction of the vibration layer 221 disposed between the second branch electrode 2232 and the first branch electrode 2222 disposed under the second branch electrode 2232 is a downward direction (↓), the vibration layer 221 has a negative polarity in an upper area adjacent to the second branch electrode 2232 and has a positive polarity in a lower area adjacent to the first branch electrode 2222. The polar direction of the vibration layer 221 may be determined by a poling process of applying an electric field to the vibration layer 221 using the first branch electrode 2222 and the second branch electrode 2232.

As shown in FIG. 13, in a case where the polar direction of the vibration layer 221 disposed between the first branch electrode 2222 and the second branch electrode 2232 disposed under the first branch electrode 2222 is an upward direction (↑), when a second-A driving voltage of positive polarity is applied to the first branch electrode 2222 and a second-B driving voltage of negative polarity is applied to the second branch electrode 2232, the vibration layer 221 may be contracted by a first force F1. The first force F1 may be a contractile force. In such a case, when a second-A driving voltage of negative polarity is applied to the first branch electrode 2222 and a second-B driving voltage of positive polarity is applied to the second branch electrode 2232, the vibration layer 221 may be expanded by a second force F2. The second force F2 may be an extensible force.

Similarly, in a case where the polar direction of the vibration layer 221 disposed between the second branch electrode 2232 and the first branch electrode 2222 disposed under the second branch electrode 2232 is a downward direction (↓), when a second-A driving voltage of positive polarity is applied to the second branch electrode 2232 and a second-B driving voltage of negative polarity is applied to the first branch electrode 2222, the vibration layer 221 may be expanded by an extensible force. Further, when a second-A driving voltage of negative polarity is applied to the second branch electrode 2232 and a second-B driving voltage of positive polarity is applied to the first branch electrode 2222, the vibration layer 511 may be contracted by a contractile force.

In such a case, when the second driving voltage applied to the first electrode 222 and the second driving voltage applied to the second electrode 223 are alternately repeated in positive and negative polarities, the vibration layer 221 repeats contraction and expansion. Thus, the second sound generator 220 vibrates. Since the second sound generator 220 is disposed on one surface of the heat radiation film 130, when the vibration layer 221 of the second sound generator 220 contracts and expands, the display panel 110 is vibrated in the third direction (Z-axis direction), which is a thickness direction of the display panel 110, by stress. In an embodiment, since the display panel 110 may be vibrated by the second sound generator 220 as described above, the display device 10 may output a sound.

Since the third sound generator 230 is substantially the same as the second sound generator 220 described above with reference to FIGS. 12 and 13, any repetitive detailed description of the third sound generator 230 will be omitted.

Figure 14:
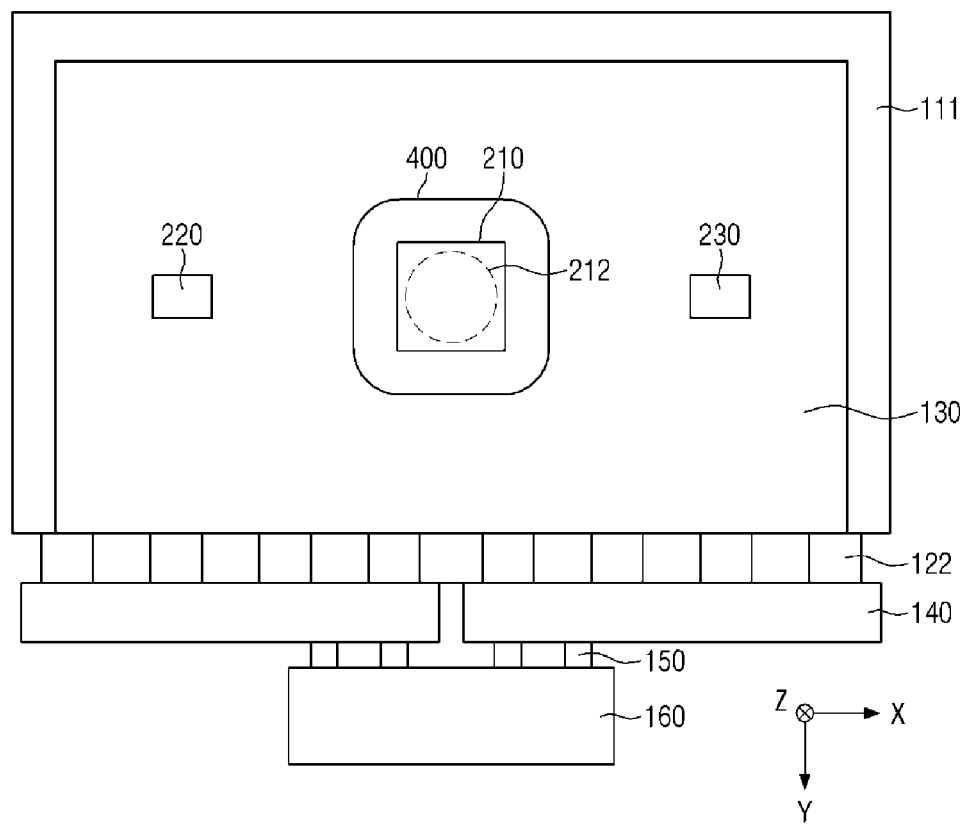
FIG. 14 is a bottom view showing an alternative embodiment of a display panel of FIG. 1 where flexible films are unfolded.

FIG. 14 is a bottom view showing an alternative embodiment of a display panel of FIG. 1 where flexible films are unfolded.

The embodiment shown in FIG. 14 is substantially the same as the embodiment shown in FIG. 2 except that the first blocking member 191, the second blocking member 192 and the third blocking member 193 are omitted. Therefore, the display panel 110 is vibrated by the first sound generator 210, the second sound generator 220, and the third sound generator 230, thereby outputting a sound.

Referring to FIG. 14, in an embodiment where the first blocking member 191, the second blocking member 192, and the third blocking member 193 are omitted, the display panel 110 has a single vibration surface.

Figure 15:
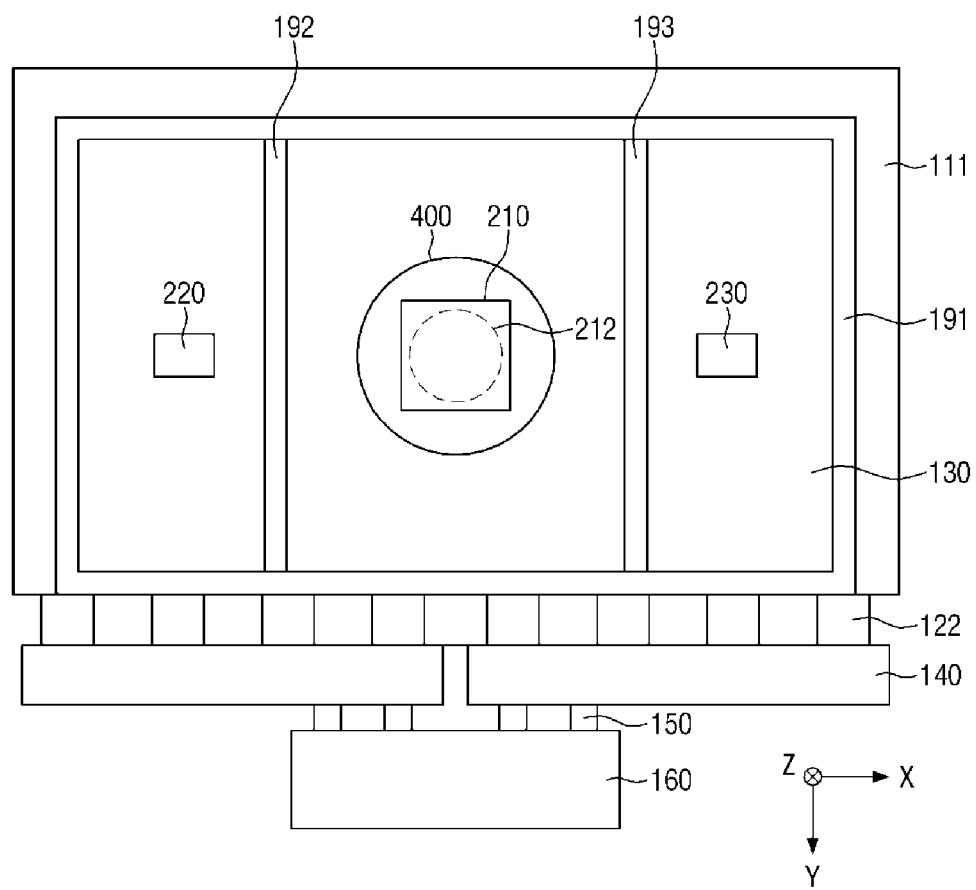
FIG. 15 a bottom view showing another alternative embodiment of a display panel of FIG. 1 where flexible films are unfolded.

FIG. 15 is a bottom view showing another alternative embodiment of a display panel in FIG. 1 where flexible films are unfolded.

The embodiment shown in FIG. 15 is substantially the same as the embodiment shown in FIG. 2 except that the vibration damping member 400 has a circular shape in a plan view.

As shown in FIG. 15, in an embodiment where the bobbin 212 of the first sound generator 210 is formed in a circular shape in a plan view, the vibration generated by the first sound generator 210 may be spread in a circular shape in a plan view. If the corners of the vibration damping member 400 is formed in a rectangular shape in a plan view, the shape of spreading vibration is different from the shape of the corner of the vibration damping member 400, such that vibration may be greatly reduced at the corners of the vibration damping member 400 or the form of vibration may be deformed. In an embodiment, the vibration damping member 400 has a circular shape in a plan view, such that the vibration generated by the first sound generator 210 may be spread as it is.

Figure 16:
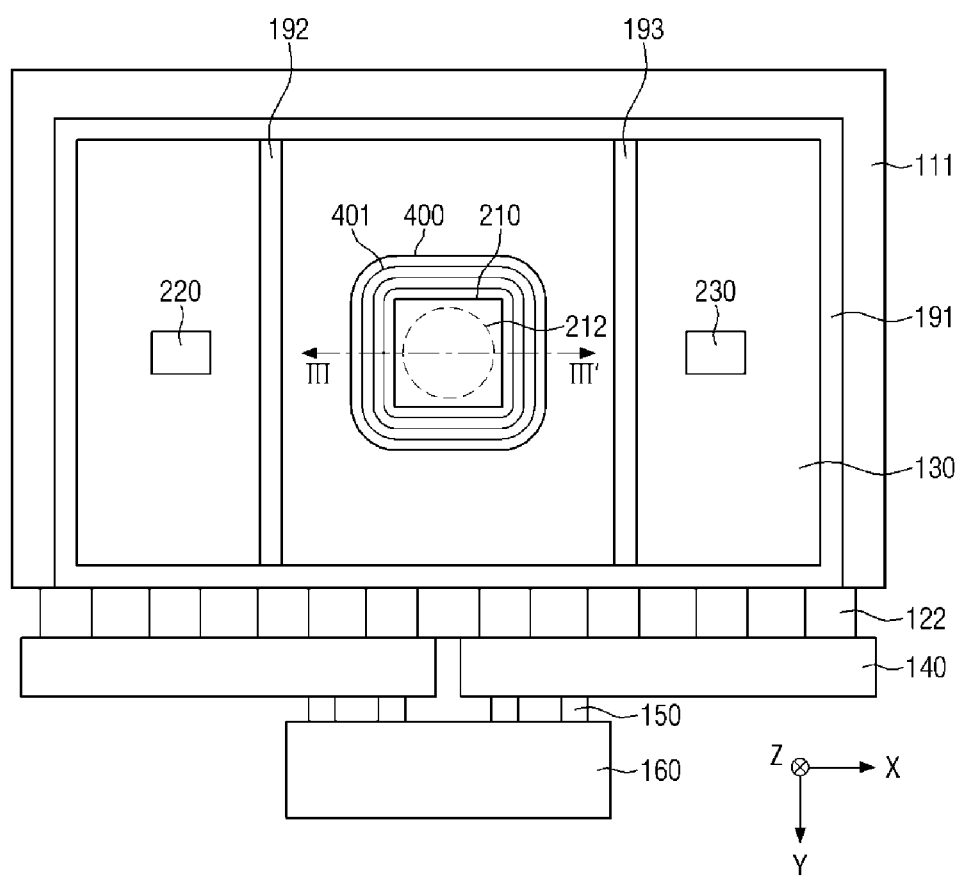
FIG. 16 a bottom view showing another alternative embodiment of a display panel of FIG. 1 where flexible films are unfolded.
Figure 17:
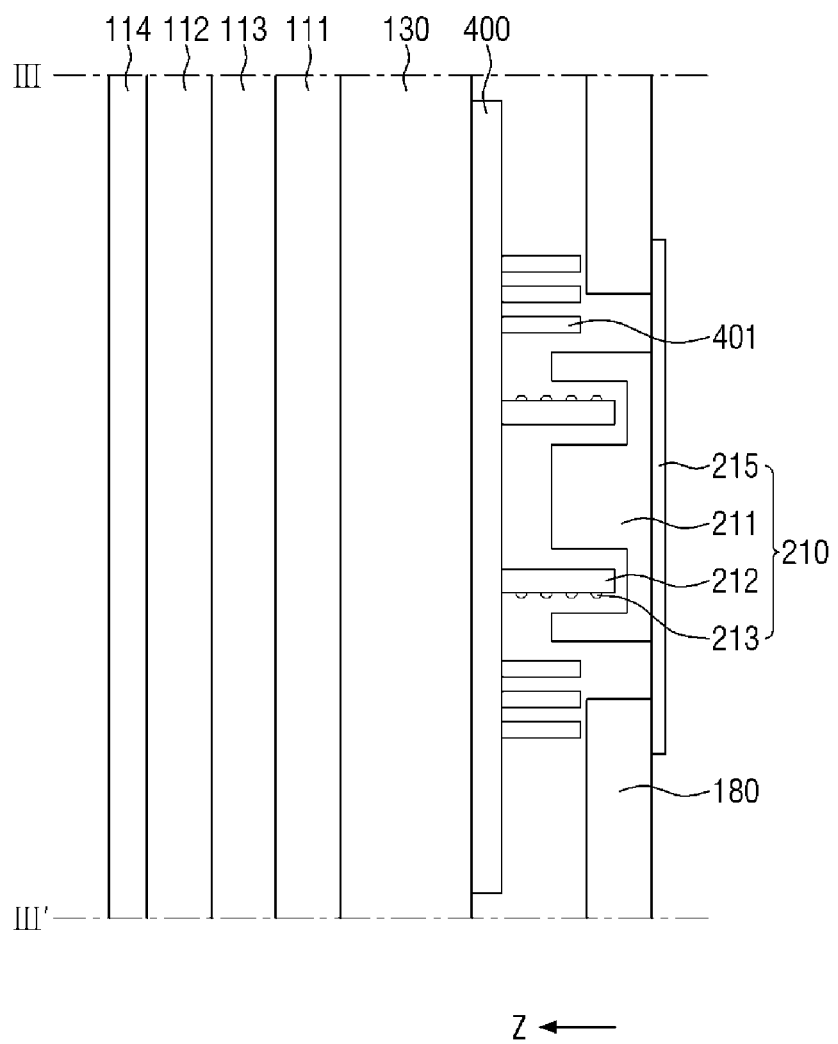
FIG. 17 is a cross-sectional view taken along line of FIG. 16.

FIG. 16 a bottom view showing another alternative embodiment of a display panel in FIG. 1 where flexible films are unfolded, and FIG. 17 is a cross-sectional view taken along line III-III' of FIG. 16.

The embodiment shown in FIGS. 16 and 17 is substantially the same as the embodiment shown in FIGS. 2 and 3 except that the vibration damping member 400 includes a plurality of heat radiation pins 401 protruding in the third direction (Z-axis direction).

Referring to FIGS. 16 and 17, in an embodiment, each of the plurality of heat radiation pins 401 may have a rectangular shape in a plan view. In an embodiment, as shown in FIGS. 16 and 17, the corners of each of the plurality of heat radiation pins 401 may be formed in a round shape having a planar curvature in a plan view, but the invention is not limited thereto. In one alternative embodiment, for example, the corners of each of the plurality of heat radiation pins 401 are formed in a rectangular shape in a plan view. The plurality of heat radiation pins 401 may be arranged in parallel with each other.

The first sound generator 210 may be disposed at a center portion of the vibration damping member 400, and the plurality of heat radiation pins 401 may be disposed at edge portions of the vibration damping member 400. The plurality of heat radiation pins 401 may be disposed to surround the first sound generator 210.

In an embodiment, as shown in FIG. 17, each of the plurality of heat radiation pins 401 may protrude from one surface of the vibration damping member 400 in the third direction (Z-axis direction). Since the contact area of the vibration damping member 400 with air may be increased due to the plurality of heat radiation pins 401, the heat generated by the vibration of the first sound generator 210 can be efficiently discharged through the vibration damping member 400.

Figure 18:
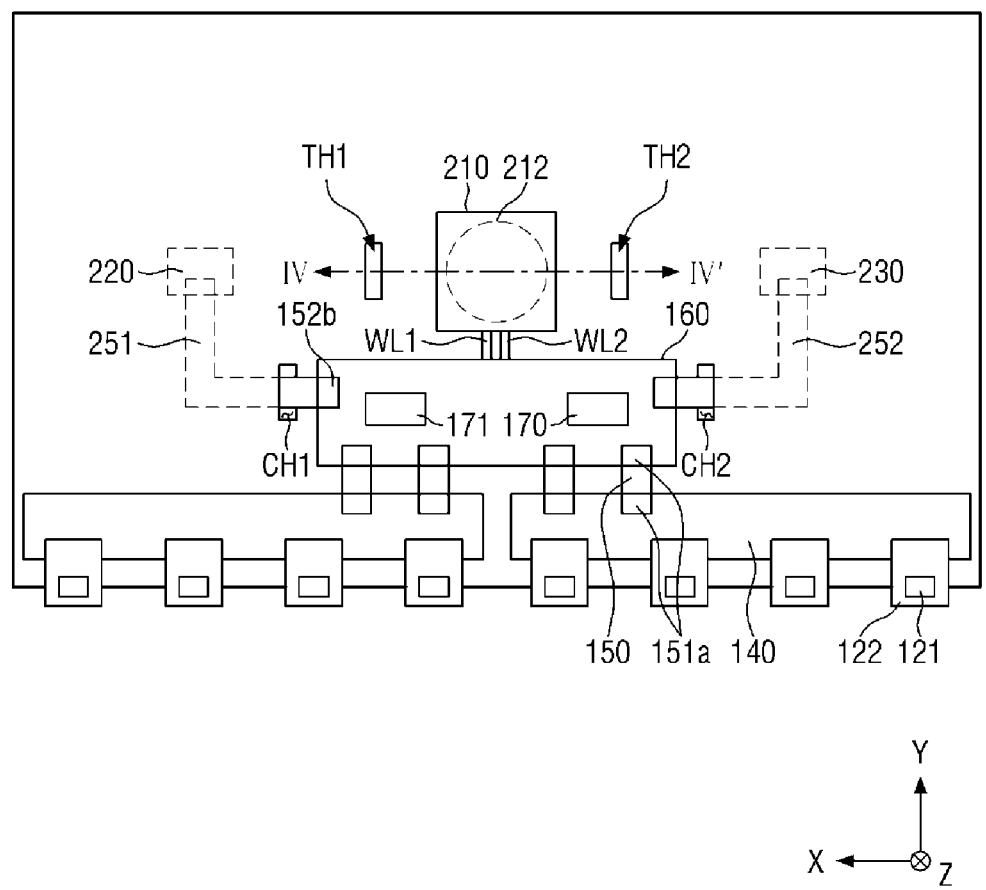
FIG. 18 is a bottom view showing another alternative embodiment of a display panel coupled with a lower chassis of FIG. 1 where flexible films are bent toward the lower portion of the lower chassis.
Figure 19:
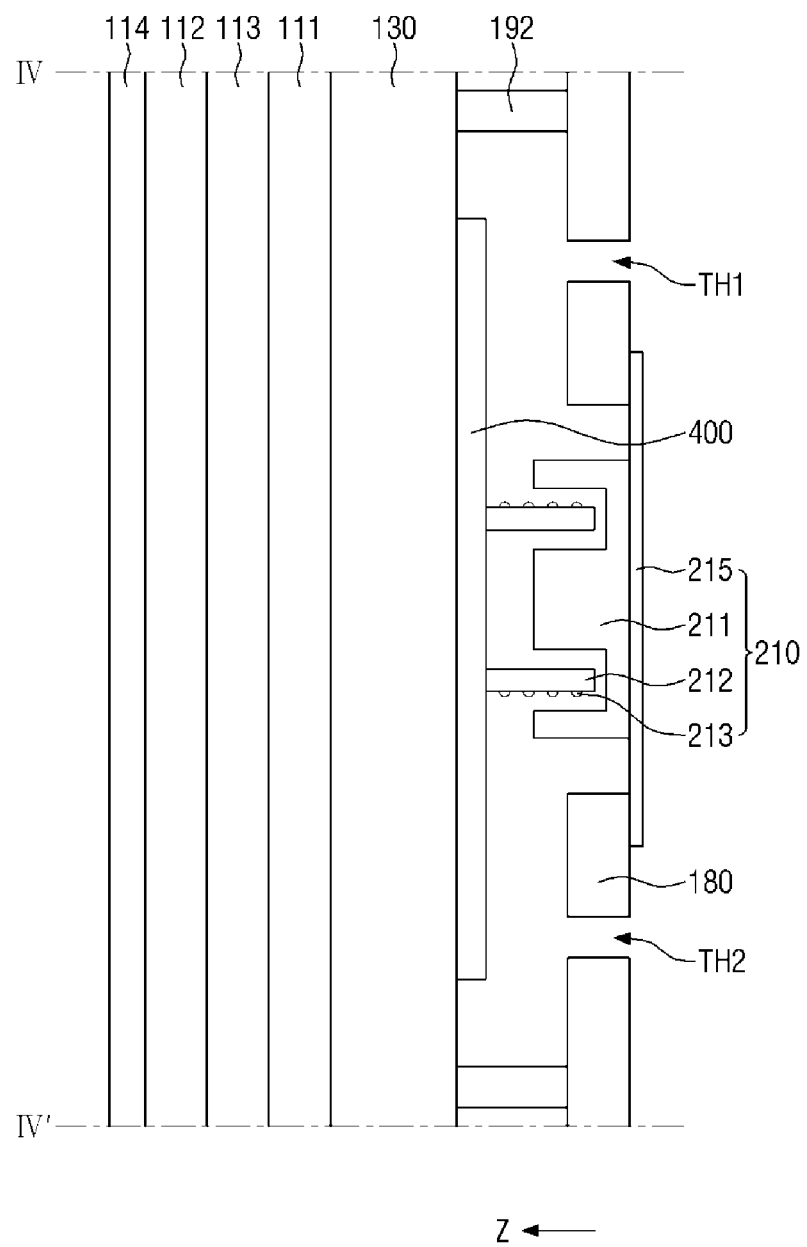
FIG. 19 is a cross-sectional view taken along line IV-IV' of FIG. 18.

FIG. 18 is a bottom view showing another alternative embodiment of a display panel coupled with a lower chassis in FIG. 1 where flexible films are bent toward the lower portion of the lower chassis, and FIG. 19 is a cross-sectional view taken along line IV-IV' of FIG. 18.

The embodiment shown in FIGS. 18 and 19 is substantially the same as the embodiment shown in FIGS. 2 and 3 except that a first through hole TH1 and a second through hole TH2 are defined in the lower chassis 180.

Referring to FIGS. 18 and 19, in an embodiment, a first through hole TH1 and a second through hole TH2, each defined through the lower chassis 189, may be formed in the lower chassis 180. In an embodiment, as shown in FIG. 18, the first through hole TH1 is disposed at the right side of the first sound generator 210 and the second through hole TH2 is disposed at the left side of the first sound generator 210, but the invention is not limited thereto. In such an embodiment, the first through hole TH1 may be disposed on one side of four sides of the first sound generator 210, and the second through hole TH2 may be disposed at another side of the four sides of the first sound generator 210. Alternatively, the first through hole TH1 and the second through hole TH2 may be formed as a single unitary unit, and may be disposed to surround the four sides of the first sound generator 210.

The first through hole TH1 and the second through hole TH2 are defined in the first area A1 surrounded by the first blocking member 191, the second blocking member 192, and the third blocking member 193. In such an embodiment, the first sound of a low frequency band, generated by the first sound generator 210, may be outputted in the backward direction of the display panel 110 due to the first through hole TH1 and the second through hole TH2. Accordingly, the user may feel a low sound more abundantly, and thus sound quality may be improved.

Figure 20:
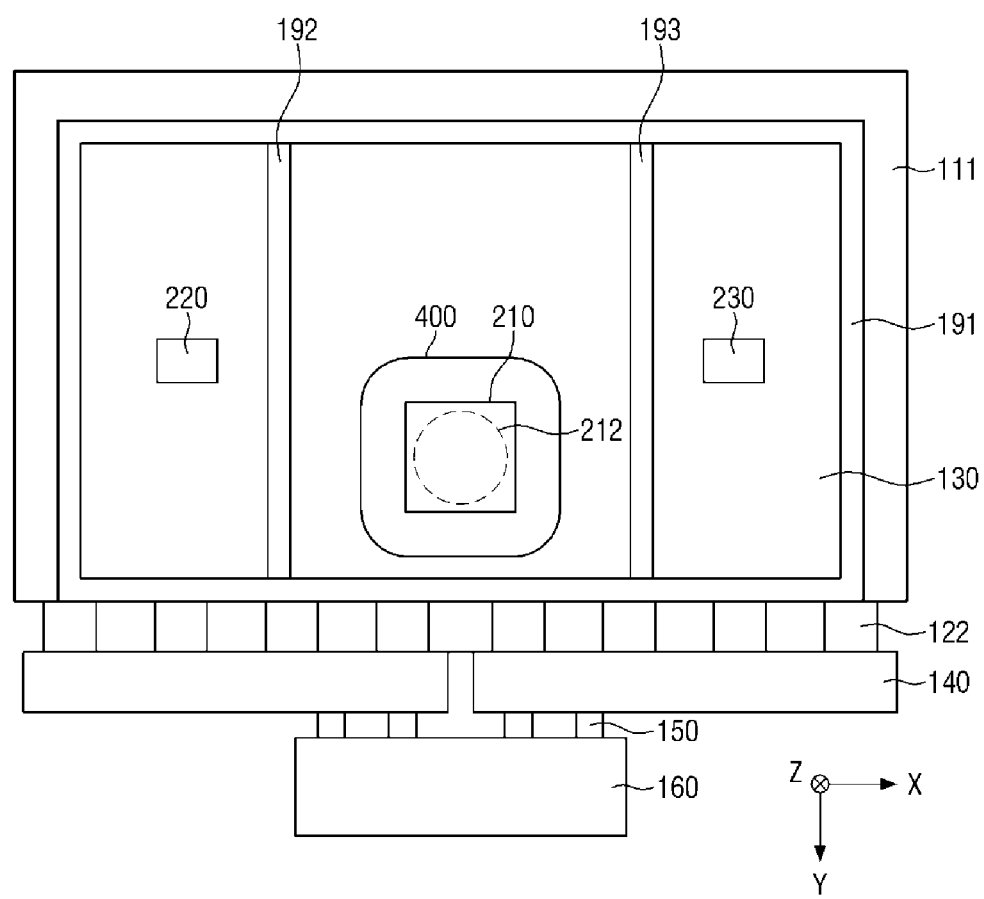
FIG. 20 a bottom view showing another alternative embodiment of a display panel of FIG. 1 where flexible films are unfolded.
Figure 21:
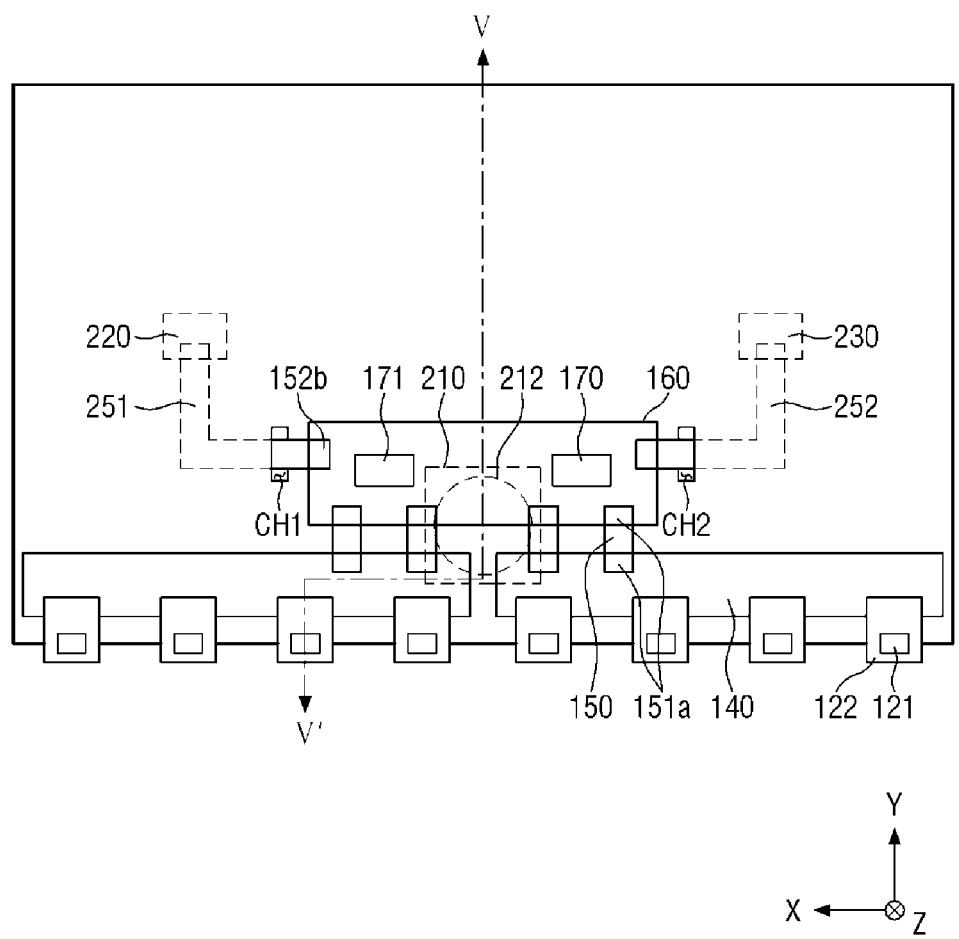
FIG. 21 is a bottom view showing another alternative embodiment of a display panel coupled with a lower chassis of FIG. 1 where flexible films are bent toward the lower portion of the lower chassis.
Figure 22:
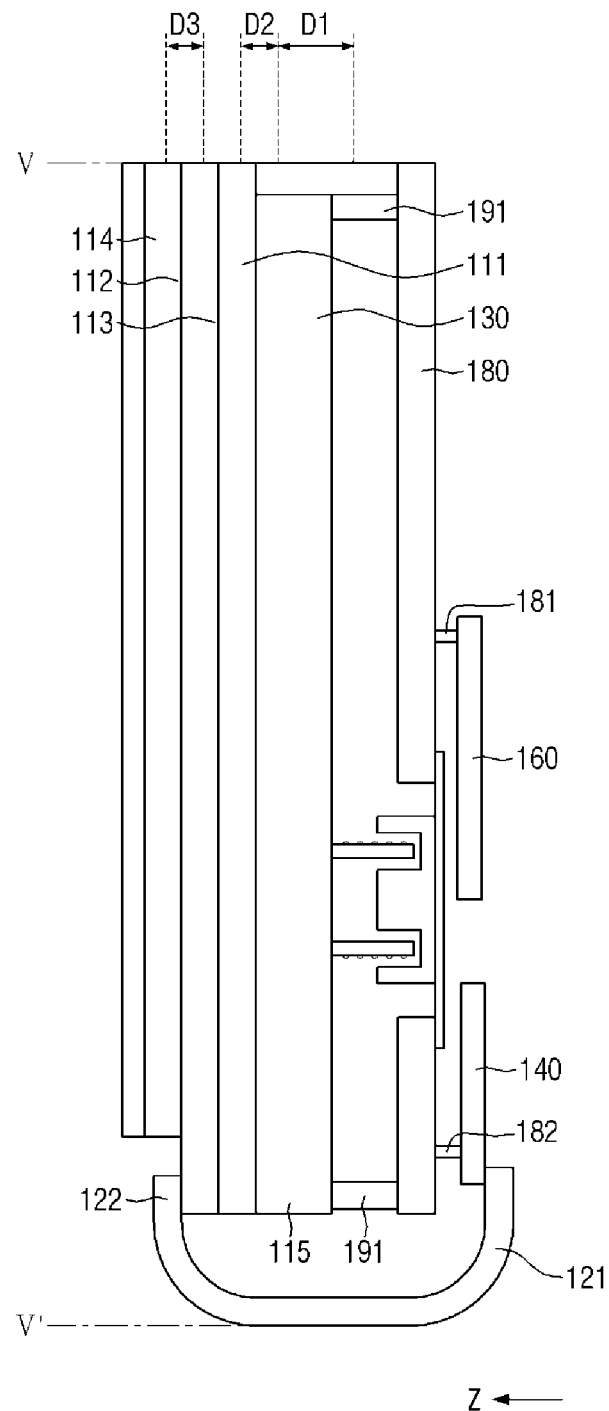
FIG. 22 is a cross-sectional view taken along line V-V' of FIG. 21.

FIG. 20 a bottom view showing another alternative embodiment of a display panel in FIG. 1 where flexible films are unfolded, FIG. 21 is a bottom view showing another alternative embodiment of a display panel coupled with a lower chassis in FIG. 1 where flexible films are bent toward the lower portion of the lower chassis, and FIG. 22 is a cross-sectional view taken along line V-V' of FIG. 21.

The embodiment shown in FIGS. 20 to 22 is substantially the same as the embodiment shown in FIGS. 2 to 4 except that the first sound generator 210 is disposed to overlap the source circuit board 140 and the control circuit board 160 in the third direction (Z-axis direction).

Referring to FIGS. 20 to 22, in an embodiment, the first sound generator 210 is disposed adjacent to the lower side of the display panel 110, and thus the first sound generator 210 may be disposed to overlap the source circuit board 140 and the control circuit board 160 in the third direction (Z-axis direction). In such an embodiment, the control circuit board 160 may not be effectively fixed directly to the lower chassis 180 due to the plate 215 of the first sound generator 210. In such an embodiment, as shown in FIG. 22, a first connection supporting portion 181 and a second connection supporting portion 182, each having a height higher than a thickness of the plate 215 of the first sound generator 210, may be disposed on the lower chassis 180.

The first connection supporting portion 181 and the second connection supporting portion 182 may be fixed to the surface of the lower chassis 180 facing the display panel and disposed opposite to each other. Each of the first connection supporting portion 181 and the second connection supporting portion 182 may include a screw groove, into which a fixing member such as a screw is fastened. The control circuit board 160 may be fixed to the first connection supporting portion 181 through a fixing member such as a screw. The source circuit board 140 may be fixed to the second connection supporting portion 182 through a fixing member such as a screw. In an embodiment, the distance between the lower chassis 180 and the source circuit board 140 is greater than the distance between the lower chassis 180 and the control circuit board 160, such that the height of the second connection supporting portion 182 may be greater than the height of the first connection supporting portion 181.

In an embodiment, as shown in FIGS. 20 to 22 that the first sound generator 210 may overlap the source circuit board 140 and the control circuit board 160, but the invention is not limited thereto. Alternatively, the first sound generator 210 may overlap one of the source circuit board 140 and the control circuit board 160.

Figure 23:
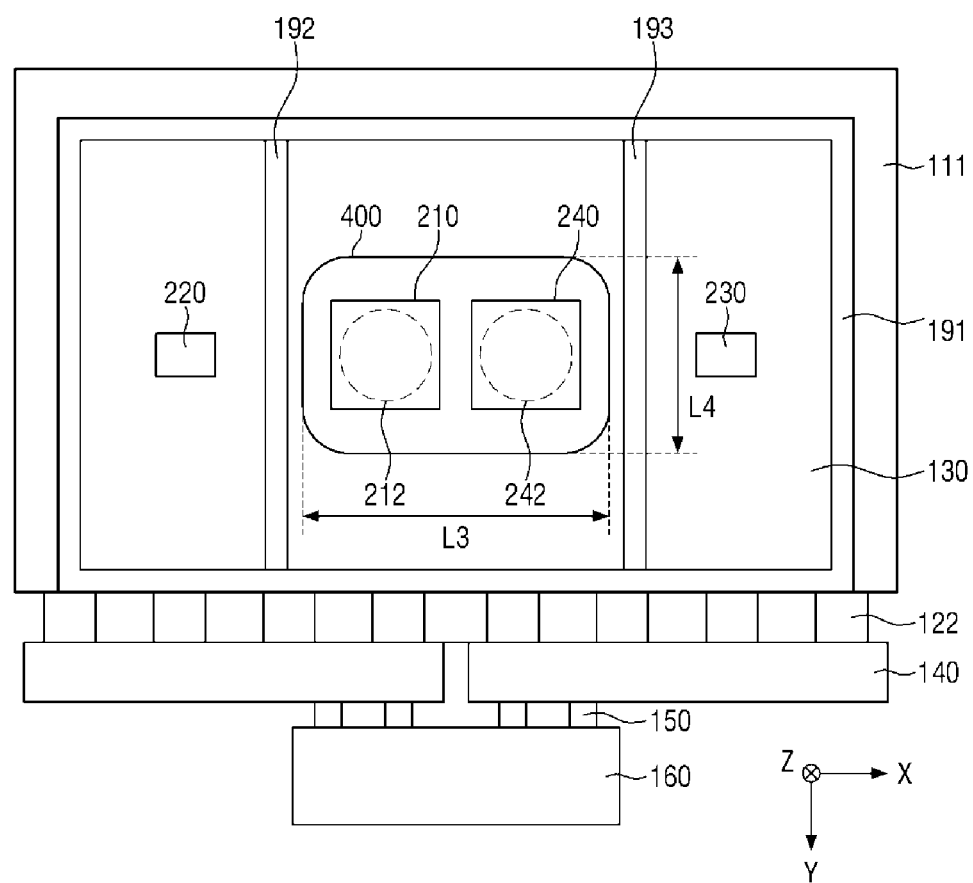
FIG. 23 a bottom view showing another alternative embodiment of a display panel in FIG. 1 where flexible films are unfolded.
Figure 24:
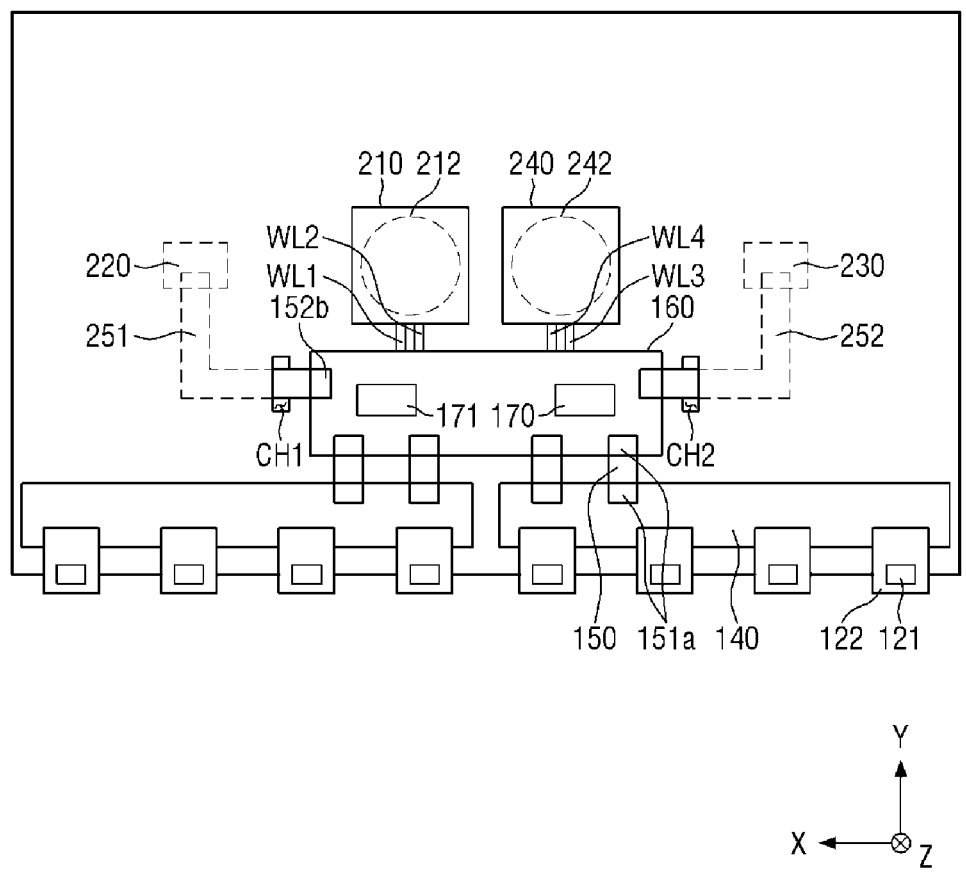
FIG. 24 is a bottom view showing another alternative embodiment of a display panel coupled with a lower chassis in FIG. 1 where flexible films are bent toward the lower portion of the lower chassis.
Figure 25:
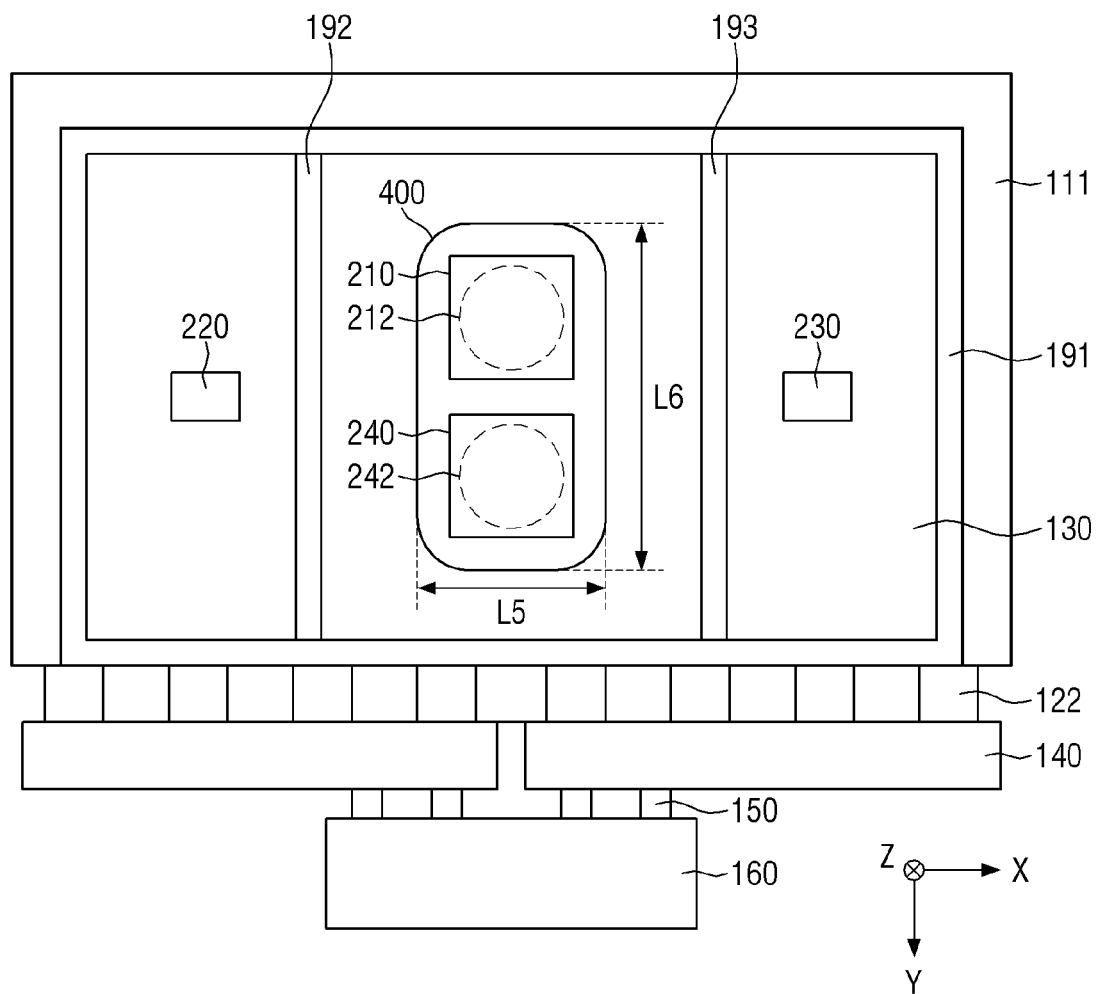
FIG. 25 a bottom view showing another alternative embodiment of a display panel in FIG. 1 where flexible films are unfolded.
Figure 26:
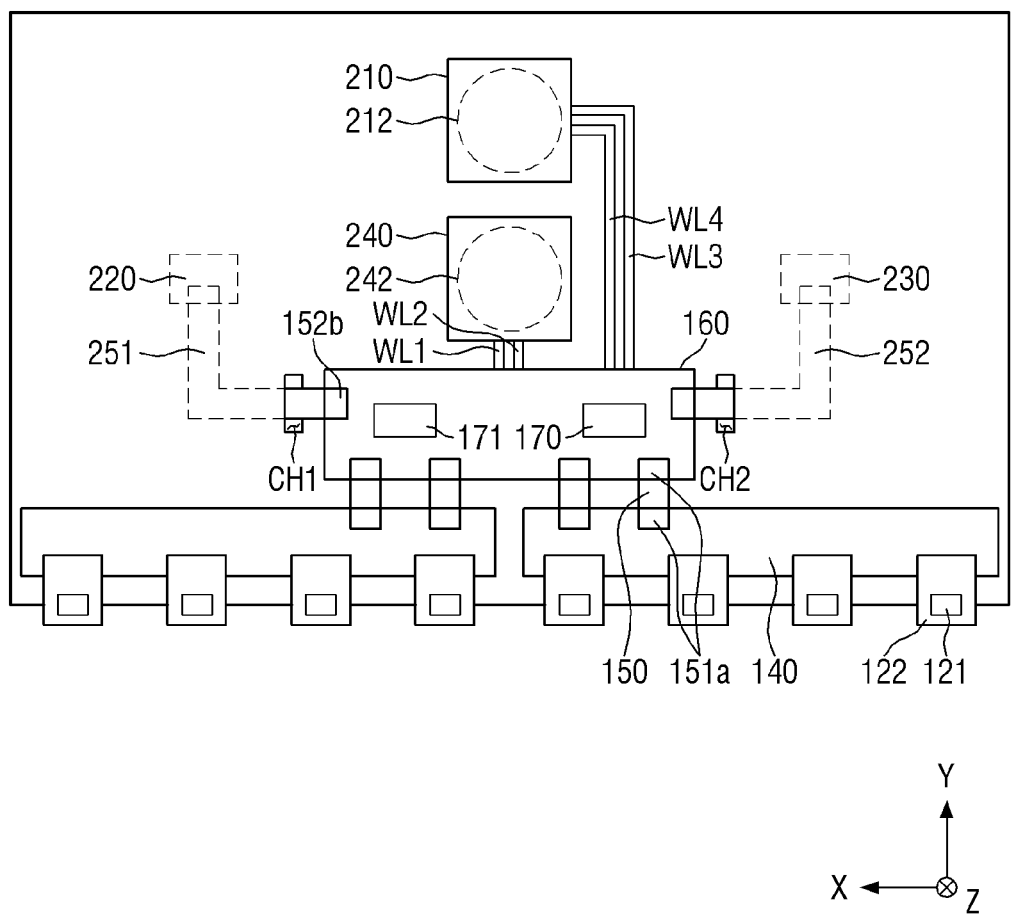
FIG. 26 is a bottom view showing another alternative embodiment of a display panel coupled with a lower chassis in FIG. 1 where flexible films are bent toward the lower portion of the lower chassis.

FIG. 23 a bottom view showing another alternative embodiment of a display panel in FIG. 1 where flexible films are unfolded, and FIG. 24 is a bottom view showing another alternative embodiment of a display panel coupled with a lower chassis in FIG. 1 where flexible films are bent toward the lower portion of the lower chassis. FIG. 25 a bottom view showing another alternative embodiment of a display panel in FIG. 1 where flexible films are unfolded, and FIG. 26 is a bottom view showing another alternative embodiment of a display panel coupled with a lower chassis in FIG. 1 where flexible films are bent toward the lower portion of the lower chassis.

The embodiments shown in FIGS. 23 to 26 are substantially the same as the embodiment shown in FIGS. 2 and 3 except that the plurality of sound generators 210 and 240 are disposed on the vibration damping member 400.

Referring to FIGS. 23 and 24, in an embodiment, the first sound generator 210 and the fourth sound generator 240 may be disposed on the vibration damping member 400. Each of the first sound generator 210 and the fourth sound generator 240 may be an exciter for vibrating the display panel 110 by generating a magnetic force using a voice coil as shown in FIGS. 10 and 11. In such an embodiment, the fourth sound generator 240 may include a magnet, a bobbin 242, a voice coil, and a plate. Since the first sound generator 210 and the fourth sound generator 240 are substantially the same as the first sound generator described above with reference to FIGS. 2 to 5, 10, and 11, any repetitive detailed description thereof will be omitted.

In such an embodiment, when the display panel 110 is vibrated using a plurality of sound generators, the vibration energy applied to the display panel 110 may be greater, compared to when the display panel 110 is vibrated using a single sound generator. Therefore, when the first sound of a low frequency band is output by vibrating the display panel 110 using the first sound generator 210 and the fourth sound generator 240, the sound pressure level of the first sound may be increased.

In an embodiment, referring back to FIG. 7, the vibration damping member 400 may reduce the vibration displacement of the display panel 110 generated by the first sound generator 210 by a maximum of 0.3 mm. In an embodiment, where the vibration damping member 400 is disposed between the display panel 110 and the first sound generator 210, the vibration displacement of the display panel 110 in the third direction (Z-axis direction), generated by the first sound generator 210, is at most 0.15 mm. Therefore, even when the fourth sound generator 240 is added to vibrate the display panel 110 by the first sound generator 210 and the fourth sound generator 240, the vibration displacement of the display panel 110 in the third direction (Z-axis direction) may be reduced as compared with a case where the vibration damping member 400 is omitted.

In an embodiment, as shown in FIGS. 23 and 24, the first sound generator 210 and the fourth sound generator 240 may be disposed in the first direction (X-axis direction) and the length L3 of the vibration damping member 400 in the first direction (X-axis direction) may be longer than the length L4 of the vibration damping member 400 in the second direction (Y-axis direction), but the invention is not limited thereto. Alternatively, as shown in FIGS. 25 and 26, the first sound generator 210 and the fourth sound generator 240 may be disposed in the second direction (Y-axis direction) and the length L5 of the vibration damping member 400 in the second direction (Y-axis direction) may be longer than the length L6 of the vibration damping member 400 in the first direction (X-axis direction). In such an embodiment, where the first sound generator 210 and the fourth sound generator 240 are disposed in the second direction (Y-axis direction), any one of the first sound generator 210 and the fourth sound generator 240 may overlap at least one of the source circuit board 140 and the control circuit board 160 as shown in FIGS. 20 to 22. Alternatively, the positions of the first sound generator 210 and the fourth sound generator 240 may be variously modified within the first area A1.

Figure 27:
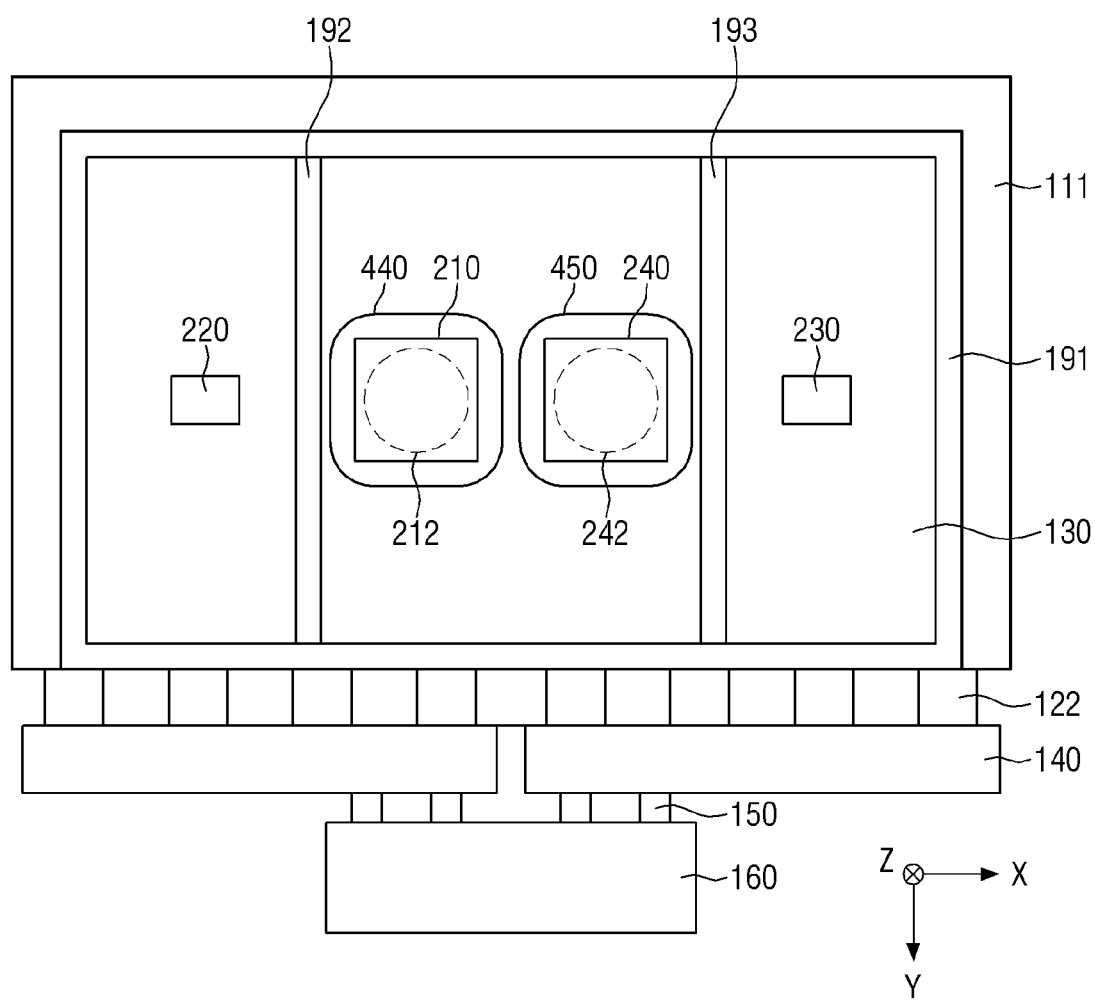
FIG. 27 a bottom view showing another alternative embodiment of a display panel when flexible films are unfolded.
Figure 28:
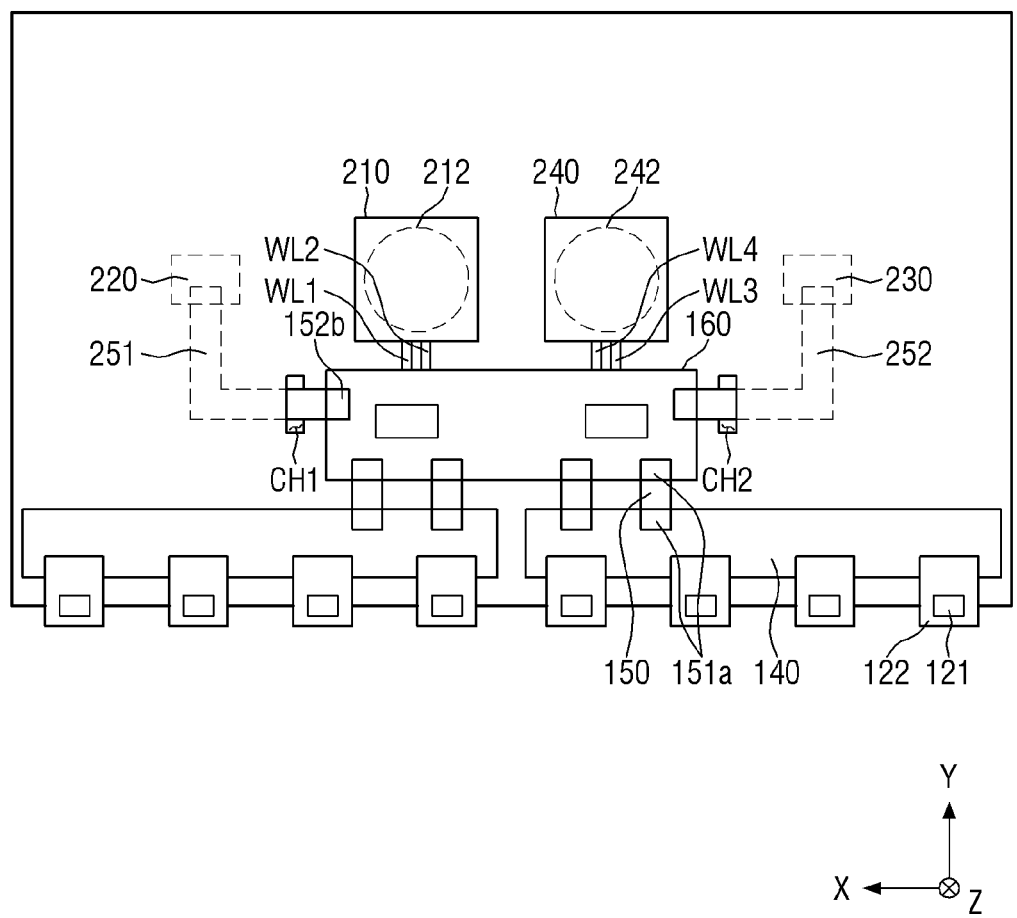
FIG. 28 is a bottom view showing another alternative embodiment of a display panel coupled with a lower chassis in FIG. 1 where flexible films are bent toward the lower portion of the lower chassis.
Figure 29:
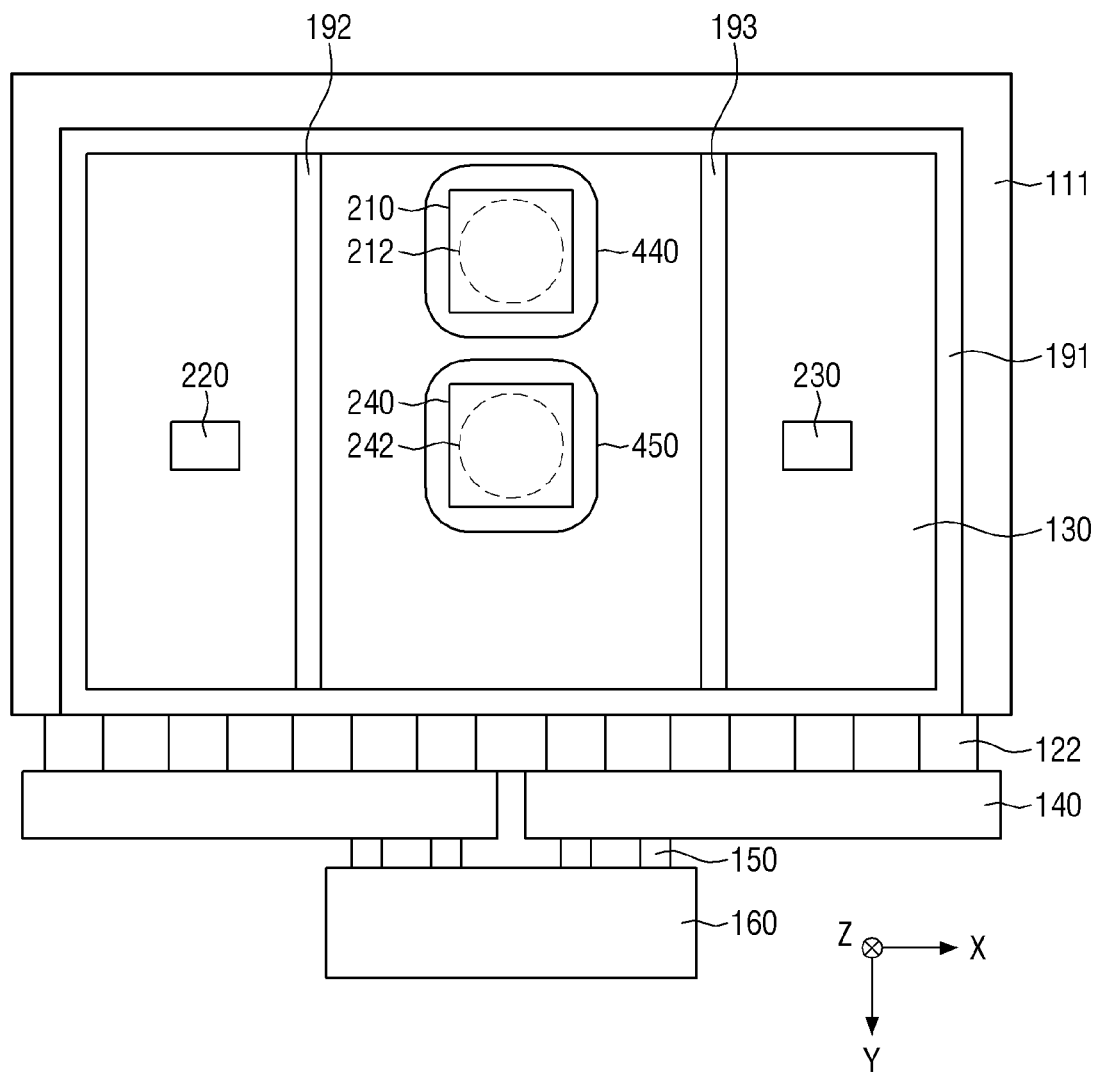
FIG. 29 a bottom view showing another alternative embodiment of a display panel in FIG. 1 where flexible films are unfolded.
Figure 30:
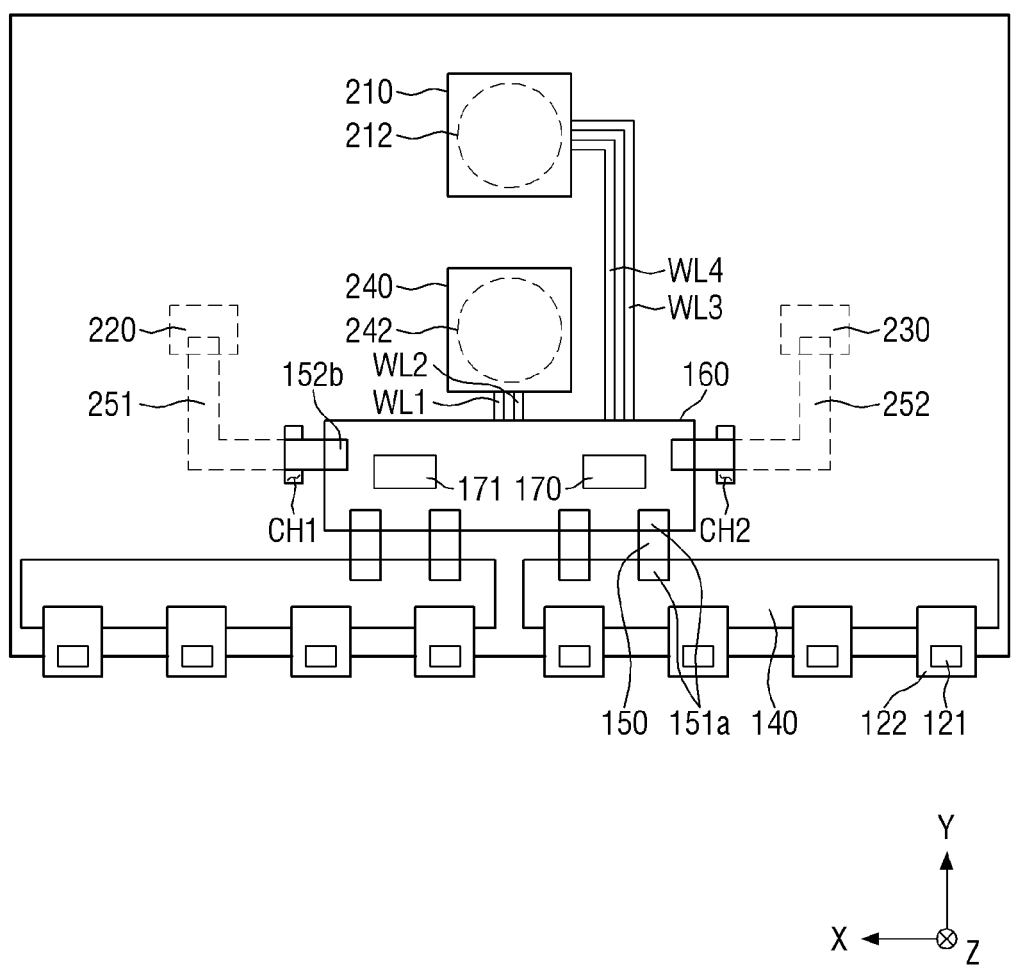
FIG. 30 is a bottom view showing another alternative embodiment of a display panel coupled with a lower chassis in FIG. 1 where flexible films are bent toward the lower portion of the lower chassis.

FIG. 27 a bottom view showing another alternative embodiment of a display panel in FIG. 1 where flexible films are unfolded, and FIG. 28 is a bottom view showing another alternative embodiment of a display panel coupled with a lower chassis in FIG. 1 where flexible films are bent toward the lower portion of the lower chassis. FIG. 29 a bottom view showing another alternative embodiment of a display panel in FIG. 1 where flexible films are unfolded, and FIG. 30 is a bottom view showing another alternative embodiment of a display panel coupled with a lower chassis in FIG. 1 where flexible films are bent toward the lower portion of the lower chassis.

The embodiments shown in FIGS. 27 to 30 are substantially the same as the embodiment shown in FIGS. 23 to 26 except that the first sound generator 210 is disposed on a first vibration damping member 440 and the fourth sound generator 240 is disposed on a second vibration damping member 450.

Referring to FIGS. 27 and 28, in an embodiment, the first sound generator 210 may be disposed on a first vibration damping member 440, and the fourth sound generator 240 may be disposed on a second vibration damping member 450. Since each of the first vibration damping member 440 and the second vibration damping member 450 is substantially the same as the vibration damping member 400 described above with reference to FIGS. 2 and 6 to 9, any repetitive detailed description thereof will be omitted. Each of the first sound generator 210 and the fourth sound generator 240 may be an exciter for vibrating the display panel 110 by generating a magnetic force using a voice coil as shown in FIGS. 10 and 11. Since the first sound generator 210 and the fourth sound generator 240 are substantially the same as those described above with reference to FIGS. 2 to 5, 10, and 11, any repetitive detailed description thereof will be omitted.

In such an embodiment, when the display panel 110 is vibrated using a plurality of sound generators, the vibration energy applied to the display panel 110 may be greater, compared to when the display panel 110 is vibrated using a single sound generator. Therefore, when the first sound of a low frequency band is output by vibrating the display panel 110 using the first sound generator 210 and the fourth sound generator 240, the sound pressure level of the first sound may be increased.

In an embodiment, as shown in FIGS. 27 and 28, the first sound generator 210 and the fourth sound generator 240 are disposed in the first direction (X-axis direction), but the invention is not limited thereto. Alternatively, as shown in FIGS. 29 and 30, the first sound generator 210 and the fourth sound generator 240 may be disposed in the second direction (Y-axis direction). In such an embodiment, where the first sound generator 210 and the fourth sound generator 240 are disposed in the second direction (Y-axis direction), any one of the first sound generator 210 and the fourth sound generator 240 may overlap at least one of the source circuit board 140 and the control circuit board 160 as shown in FIGS. 20 to 22. Alternatively, the positions of the first sound generator 210 and the fourth sound generator 240 may be variously modified within the first area A1.

Figure 31:
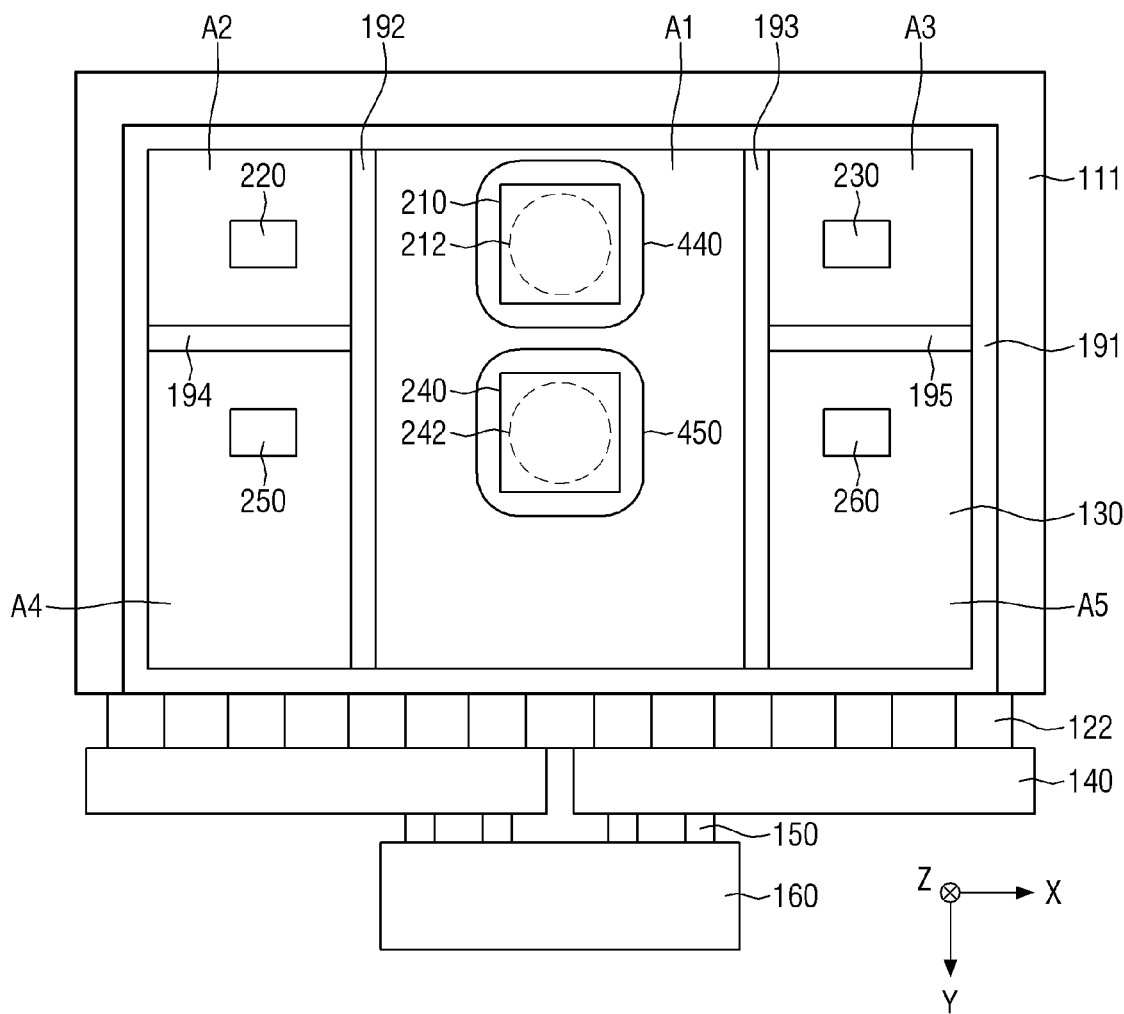
FIG. 31 is a bottom view showing another alternative embodiment of a display panel in FIG. 1 where flexible films are unfolded.
Figure 32:
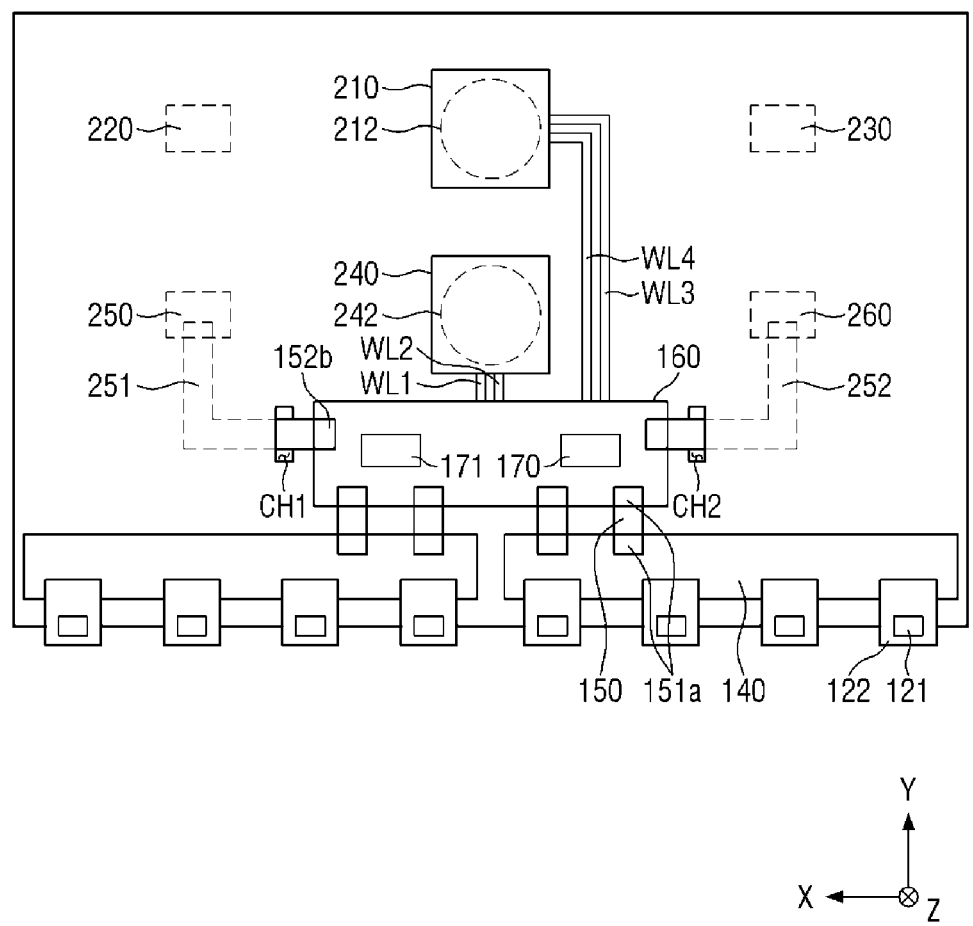
FIG. 32 is a bottom view showing another alternative embodiment of a display panel coupled with a lower chassis in FIG. 1 where flexible films are bent toward the lower portion of the lower chassis.

FIG. 31 is a bottom view showing another alternative embodiment of a display panel in FIG. 1 where flexible films are unfolded, and FIG. 32 is a bottom view showing another alternative embodiment of a display panel coupled with a lower chassis in FIG. 1 where flexible films are bent toward the lower portion of the lower chassis.

The embodiment shown in FIGS. 31 and 32 is substantially the same as the embodiment shown in FIGS. 2 and 3 except that a fourth sound generator 240, a fifth sound generator 250, and a sixth sound generator 260 are further provided.

Referring to FIGS. 31 and 32, the first sound generator 210 may be disposed closer to the center of the display panel 110 as compared with the second sound generator 220 and the third sound generator 230. The second sound generator 220 may be disposed closer to one side of the display panel 110, for example, the right side of the display panel 110. The third sound generator 230 may be disposed closer to another side of the display panel, for example, the left side of the display panel 110.

The fourth sound generator 240 may be disposed closer to the center of the display panel 110 as compared with the fifth sound generator 250 and the sixth sound generator 260. The fifth sound generator 250 may be disposed closer to one side of the display panel 110, for example, the right side of the display panel 110. The sixth sound generator 260 may be disposed closer to another side of the display panel, for example, the left side of the display panel 110.

In an embodiment, as shown in FIGS. 31 and 32, the first sound generator 210 and the fourth sound generator 240 may be disposed in the second direction (Y-axis direction), but the invention is not limited thereto. Alternatively, the first sound generator 210 and the fourth sound generator 240 may be disposed in the first direction (X-axis direction), as shown in FIG. 23. In an embodiment, where the first sound generator 210 and the fourth sound generator 240 are disposed in the second direction (Y-axis direction), any one of the first sound generator 210 and the fourth sound generator 240 may overlap at least one of the source circuit board 140 and the control circuit board 160 as shown in FIGS. 20 to 22. Alternatively, the positions of the first sound generator 210 and the fourth sound generator 240 may be variously modified within the first area A1.

Each of the second sound generator 220, the third sound generator 230, the fifth sound generator 250, and the sixth sound generator 260 may be a piezoelectric element or piezoelectric actuator for vibrating the display panel 110 using a piezoelectric material that contracts and expands according to the applied voltage as shown in FIGS. 2 to 5, 12, and 13. Since the second sound generator 220, the third sound generator 230, the fifth sound generator 250, and the sixth sound generator 260 are substantially the same as those described above with reference to FIGS. 12 and 13, any repetitive detailed description thereof will be omitted.

The first sound generator 210 may be disposed on the first vibration damping member 440, and the fourth sound generator 240 may be disposed on the second vibration damping member 450. Since the first vibration damping member 440 and the second vibration damping member 450 are substantially the same as those described with reference to FIGS. 2 and 6 to 9, any repetitive detailed description thereof will be omitted.

A first blocking member 191, a second blocking member 192, a third blocking member 193, a fourth blocking member 194, and a fifth blocking member 195 may serve to block the propagation of vibration of the display panel 110 generated by the sound generators 210, 220, 230, 240, and 250 or block the transmission of a sound generated by the vibration of the display panel 110. The first blocking member 191, the second blocking member 192, the third blocking member 193, the fourth blocking member 194, and the fifth blocking member 195 may be attached to one surface of the heat radiation film 130 and one surface of the lower chassis 180, which are opposite to each other. Alternatively, the heat radiation film 130 may be omitted, and the first blocking member 191, the second blocking member 192, the third blocking member 193, the fourth blocking member 194, and the fifth blocking member 195 may be attached to one surface of the first substrate 111 and the one surface of the lower chassis 180.

The first blocking member 191 may be disposed on four side edge portions of the heat radiation film 130 as shown in FIG. 2. The second blocking member 192 may extend in the second direction (Y-axis direction), and may be disposed between the first sound generator 210 and the second sound generator 220 and between the fourth sound generator 240 and the fifth sound generator 250. The third blocking member 193 may extend in the second direction (Y-axis direction), and may be disposed between the first sound generator 210 and the third sound generator 230 and between the fourth sound generator 240 and the sixth sound generator 260. The fourth blocking member 194 may extend in the first direction (X-axis direction), and may be disposed between the second sound generator 220 and the fifth sound generator 250. The fifth blocking member 195 may extend in the first direction (X-axis direction), and may be disposed between the third sound generator 230 and the sixth sound generator 260. Thus, the vibration plane of the display panel 110 may be divided into five areas A1, A2, A3, A4, and A5 as shown in FIG. 31.

The first sound generator 210 and the fourth sound generator 240 may be disposed in the first area A1 surrounded by the first blocking member 191, the second blocking member 192, and the third blocking member 193. Each of the second sound generator 220 and the fifth sound generator 250 may be disposed respectively in the second area A2 and the fourth area A4 surrounded by the first blocking member 191, the second blocking member 192, and the fourth blocking member 194. The third sound generator 230 and the sixth sound generator 260 may be disposed respectively in the third area A3 and the fifth area A5 surrounded by the first blocking member 191, the third blocking member 193, and the fifth blocking member 195.

Since the first sound generator 210, the second sound generator 220, the third sound generator 230, the fourth sound generator 240, the fifth sound generator 250, and the sixth sound generator 260 may be disposed in different areas A1, A2, A3, A4, and A5 surrounded by the first blocking member 191, the second blocking member 192, the third blocking member 193, the fourth blocking member 194 and the fifth blocking member 195, it may be reduced that the vibration of the display panel 110 generated by the first sound generator 210, the vibration of the display panel 110 generated by the second sound generator 220, the vibration of the display panel 110 generated by the third sound generator 230, the vibration of the display panel 110 generated by the fourth sound generator 240, and the vibration of the display panel 110 generated by the fifth sound generator 250 influence each other.

The first sound generator 210, the second sound generator 220, the third sound generator 230, the fourth sound generator 240, the fifth sound generator 250, and the sixth sound generator 260 may be disposed in different areas surrounded by the first blocking member 191, the second blocking member 192, the third blocking member 193, the fourth blocking member 194, and the fifth blocking member 195. In one embodiment, for example, as shown in FIG. 31, the first sound generator 210 and the fourth sound generator 240 may be disposed in the first area A1, the second sound generator 220 may be disposed in the second area A2, and the third sound generator 230 may be disposed in the third area A3. in such an embodiment, the fifth sound generator 250 may be disposed in the fourth area A4, and the sixth sound generator 260 may be disposed in the fifth area A5. Therefore, the first sound generator 210 and the fourth sound generator 240 may output a first sound of a low frequency band by vibrating the first area A1 of the display panel 110. In such an embodiment, the second sound generator 220 may output a second sound, which is a right upper stereo sound of a high frequency band, by vibrating the second area A2 of the display panel 110. In such an embodiment, the third sound generator 230 may output a third sound, which is a left upper stereo sound of a high frequency band, by vibrating the third area A3 of the display panel 110. In such an embodiment, the fourth sound generator 240 may output a fourth sound, which is a right lower stereo sound of a high frequency band, by vibrating the fourth area A4 of the display panel 110. In such an embodiment, the fifth sound generator 250 may output a fifth sound, which is a left lower stereo sound of a high frequency band, by vibrating the fifth area A5 of the display panel 110. Accordingly, the display device 10 may provide a stereo sound of a 4.1 channel to the user.

In an embodiment, where a blocking member is additionally disposed between the first sound generator 210 and the fourth sound generator 240, the first area A1 may be divided into two areas. In such an embodiment, since each of the first sound generator 210 and the fourth sound generator 240 may output a low sound, the display device 10 may provide a stereo sound of a 4.1 channel to the user.

While the invention has been particularly shown and described with reference to embodiments thereof, it will be understood by those of ordinary skill in the art that various changes in form and details may be made therein without departing from the spirit or scope of the invention as defined by the following claims.

What is claimed is:
1. A display device, comprising:
a display panel;
a first sound generator disposed on a surface of the display panel, wherein the first sound generator vibrates the display panel to output a first sound;
a first vibration damping member disposed between the display panel and the first sound generator, wherein the first vibration damping member reduces a vibration displacement of the display panel;
blocking members disposed on the surface of the display panel and disposed to surround the first sound generator, wherein the blocking members define a first area in which the first sound generator is disposed in a plan view; and
a lower chassis disposed on the surface of the display panel, where a through hole is defined in the lower chassis, wherein the through hole is in the first area in the plan view.
2. The display device of claim 1,
wherein the first vibration damping member includes a first metal plate and a second metal plate facing each other, and an adhesive layer disposed between the first metal plate and the second metal plate.

3. The display device of claim 2, wherein a thickness of the first metal plate and a thickness of the second metal plate is less than a thickness of the adhesive layer.

4. The display device of claim 1, wherein the first vibration damping member includes a corner having a curvature in a plan view.

5. The display device of claim 1, wherein the first vibration damping member has a circular shape in a plan view.

6. The display device of claim 1, wherein the first vibration damping member includes a heat radiation pin protruding in a thickness direction of the display panel.

7. The display device of claim 6, wherein the heat radiation pin is disposed to surround the first sound generator.

8. The display device of claim 1, wherein an area of the first vibration damping member is smaller than an area of the first area.

9. The display device of claim 1, wherein the first sound generator includes:
a bobbin disposed on the first vibration damping member;
a voice coil surrounding the bobbin; and
a magnet disposed on the bobbin and spaced apart from the bobbin.

10. The display device of claim 1, further comprising:
a second sound generator disposed on the surface of the display panel,
wherein the second sound generator outputs a second sound by vibrating the display panel, and
the second sound is in a higher frequency band than the first sound.

11. The display device of claim 10, wherein the second sound generator does not overlap the first vibration damping member in a thickness direction of the display panel.

12. The display device of claim 10, further comprising:
a third sound generator disposed on the surface of the display panel,
wherein the third sound generator outputs a third sound by vibrating the display panel, and
the third sound is in a higher frequency band than the first sound.

13. The display device of claim 12, further comprising:
blocking members disposed on the surface of the display panel and disposed between the first sound generator and the second sound generator and between the first sound generator and the third sound generator.

14. The display device of claim 12, wherein each of the second sound generator and the third sound generator includes:
a first electrode to which a first driving voltage is applied;
a second electrode to which a second driving voltage is applied; and
a vibration layer disposed between the first electrode and the second electrode, wherein the vibration layer includes a piezoelectric material which contracts and expands in response to the first driving voltage applied to the first electrode and the second driving voltage applied to the second electrode.

15. The display device of claim 1, further comprising:
a flexible film attached to a side portion of the display panel; and
a control circuit board disposed on the lower chassis and electrically connected to the flexible film.

16. The display device of claim 15, wherein the first sound generator does not overlap the control circuit board in a thickness direction of the display panel.

17. The display device of claim 15, wherein the control circuit board is disposed on the first sound generator, and
the control circuit board is fixed to a connection supporting portion disposed on the lower chassis.

18. The display device of claim 12, further comprising:
a fourth sound generator disposed on the surface of the display panel,
wherein the fourth sound generator outputs a fourth sound by vibrating the display panel, and
the fourth sound is in a lower frequency band than the second sound.

19. The display device of claim 18, wherein the fourth sound generator is disposed on the first vibration damping member.

20. The display device of claim 18, further comprising:
a second vibration damping member disposed between the display panel and the fourth sound generator, wherein the second vibration damping member reduces the vibration displacement of the display panel.

21. The display device of claim 18, further comprising:
a fifth sound generator disposed on the surface of the display panel, wherein the fifth sound generator outputs a fifth sound by vibrating the display panel, and the fifth sound is in a higher frequency band than the first sound; and
a sixth sound generator disposed on the surface of the display panel, wherein the sixth sound generator outputs a sixth sound by vibrating the display panel, and the sixth sound is in a higher frequency band than the first sound.

22. The display device of claim 21, further comprising:
blocking members disposed on the surface of the display panel between the first sound generator and the second sound generator, between the first sound generator and the third sound generator, between the fourth sound generator and the fifth sound generator, between the fourth sound generator and the sixth sound generator, between the second sound generator and the fifth sound generator, and between the third sound generator and the sixth sound generator.

* * * * *